United States Patent
Bergström et al.

(10) Patent No.: US 11,956,180 B2
(45) Date of Patent: *Apr. 9, 2024

(54) METHODS AND APPARATUSES FOR DETERMINING OR INDICATING SERVING-CELL OPERATIONAL STATES, FOR A WIRELESS COMMUNICATION DEVICE

(71) Applicant: Telefonaktiebolaget LM Ericsson (publ), Stockholm (SE)

(72) Inventors: Mattias Bergström, Sollentuna (SE); Robert Karlsson, Sundbyberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 150 days.

This patent is subject to a terminal disclaimer.

(21) Appl. No.: 17/592,100

(22) Filed: Feb. 3, 2022

(65) Prior Publication Data
US 2022/0158813 A1 May 19, 2022

Related U.S. Application Data

(63) Continuation of application No. 16/975,263, filed as application No. PCT/IB2019/051537 on Feb. 26, 2019, now Pat. No. 11,265,136.
(Continued)

(51) Int. Cl.
*H04L 5/00* (2006.01)
(52) U.S. Cl.
CPC ................................ *H04L 5/0098* (2013.01)
(58) Field of Classification Search
CPC .................................................... H04L 5/0098
See application file for complete search history.

(56) References Cited

U.S. PATENT DOCUMENTS 9,253,095 B2  2/2016 Buyukkoc et al.
11,265,136 B2 * 3/2022 Bergström .............. H04L 5/001
(Continued)

FOREIGN PATENT DOCUMENTS

EP    2943034 A9   8/2016

OTHER PUBLICATIONS

"SCell New State Transitions and Signalling Procedures", 3GPP TSG-RAN2 Meeting #101, R2-1802074, Qualcomm Inc., Athens, Greece, Feb. 26-Mar. 2, 2018, 3 pages.
(Continued)

*Primary Examiner* — Kevin C. Harper
(74) *Attorney, Agent, or Firm* — Murphy, Bilak & Homiller, PLLC

(57) ABSTRACT

Example methods and apparatuses provide for the advantageous use of "first" and "second" indicators for cell state control with respect to a wireless communication device. When sent singularly, the first indicator indicates activated/deactivated state transitions according to corresponding sequential state transition logic implemented in the device, and the second indicator indicates activated/dormant state transitions according to corresponding sequential state transition logic implemented in the device. When sent jointly for a given serving cell of the device, the first and second indicators operate as a combinational pair that indicates what the operational state of the cell shall be for the device, irrespective of the current cell state. As an example, then, the foregoing "arrangement" allows the network to use single-bit per cell signaling for many state-control scenarios, including "normal" use of legacy activation/deactivation indicators, while also providing absolute state control via two-bit per cell signaling that does not depend on the current state of the cell.

20 Claims, 12 Drawing Sheets

Related U.S. Application Data

(60) Provisional application No. 62/635,870, filed on Feb. 27, 2018.

(56) References Cited

U.S. PATENT DOCUMENTS

| | | |
|---|---|---|
| 2015/0092707 A1 | 4/2015 | Kwon |
| 2015/0319778 A1 | 11/2015 | Folke et al. |
| 2016/0128003 A1 | 5/2016 | Callender et al. |
| 2016/0301513 A1 | 10/2016 | He et al. |
| 2016/0302177 A1 | 10/2016 | Kwon et al. |
| 2016/0373233 A1 | 12/2016 | Pelletier et al. |
| 2019/0124558 A1 | 4/2019 | Ang et al. |
| 2019/0190682 A1 | 6/2019 | Kadiri et al. |
| 2019/0200413 A1 | 6/2019 | Hong |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.0.0, Dec. 2017, pp. 1-109.

"MAC CE for the new SCell state", 3GPP TSG-RAN WG2 Meeting #101, R2-1802002, vivo, Athens, Greece, Feb. 26-Mar. 2, 2018, 3 pages.

"Remaining details of New SCell state", 3GPP TSG-RAN WG2#101, R2-1802755, Nokia, Nokia Shanghai Bell, Athens, Greece, Feb. 26-Mar. 3, 2018, 4 pages.

"Add Cell values in OTDOA Table for 3DL RSTD Measurement Reporting Delay", 3GPP TSG-RAN WG5 Meeting #70, R5-160146, Pctest Engineering Laboratory, Malta, Malta, Feb. 15-19, 2016, 10 pages.

\* cited by examiner

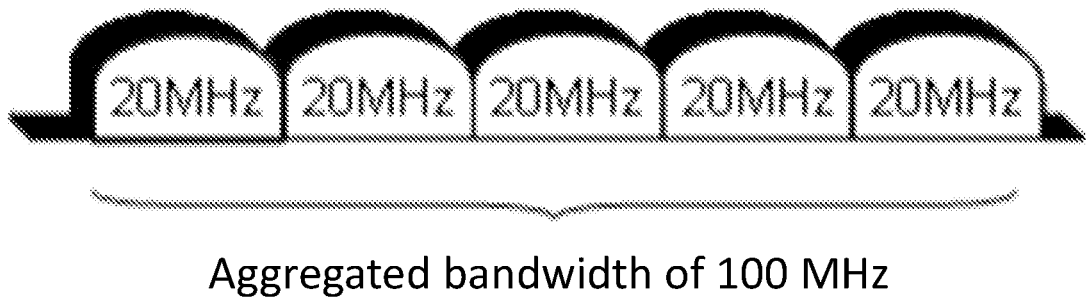
Fig. 1
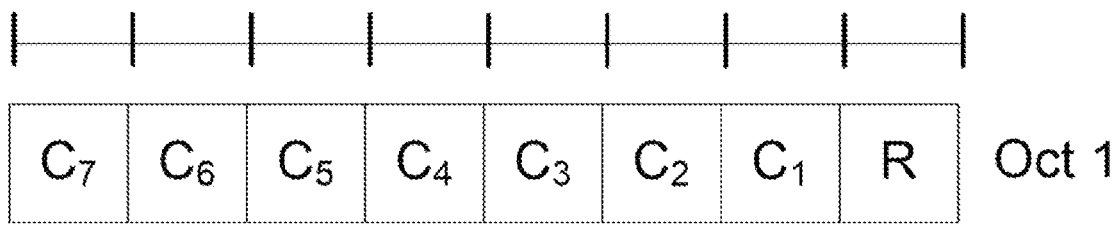
Fig. 2
| $C_3$ | $C_3$ | $C_2$ | $C_2$ | $C_1$ | $C_1$ | R | R |
|---|---|---|---|---|---|---|---|
| $C_7$ | $C_7$ | $C_6$ | $C_6$ | $C_5$ | $C_5$ | $C_4$ | $C_4$ |
Fig. 3

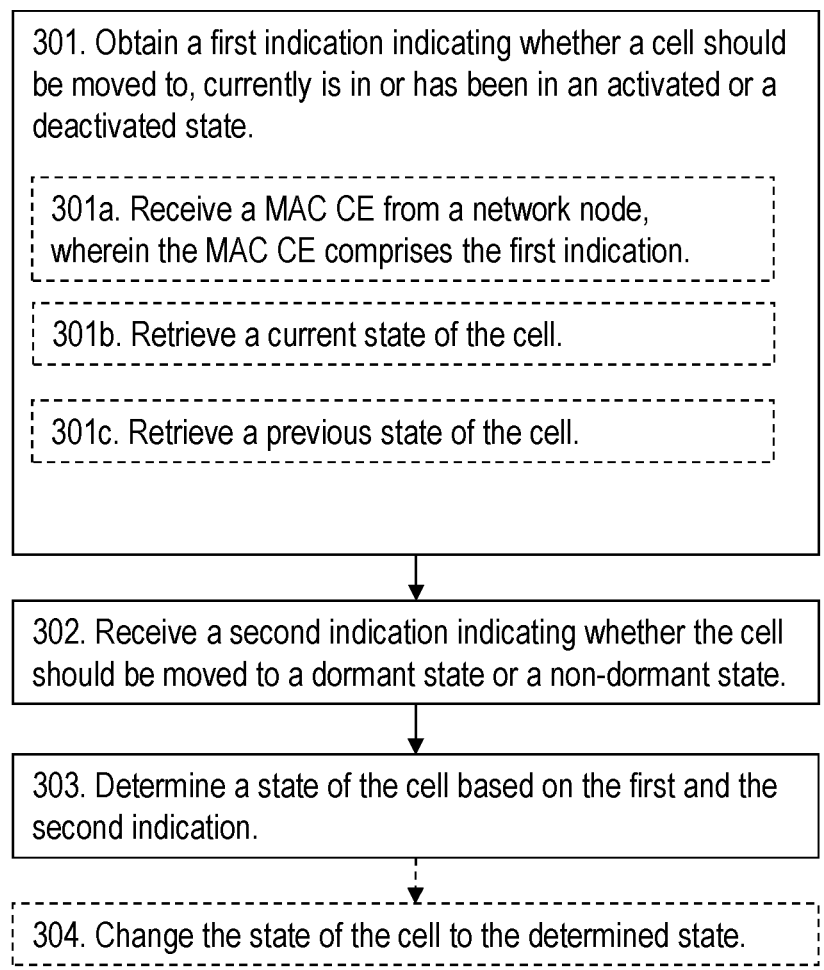
Fig. 5 Method in UE 120

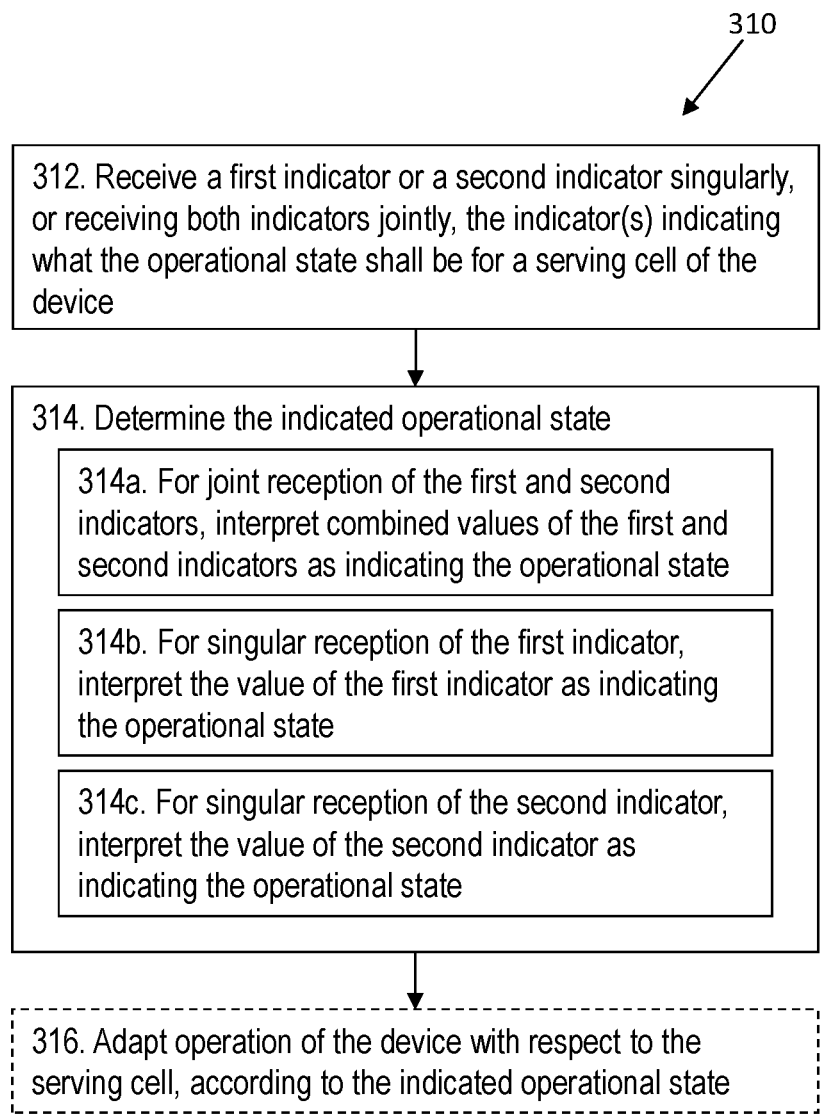
Fig. 5a Method in UE 120

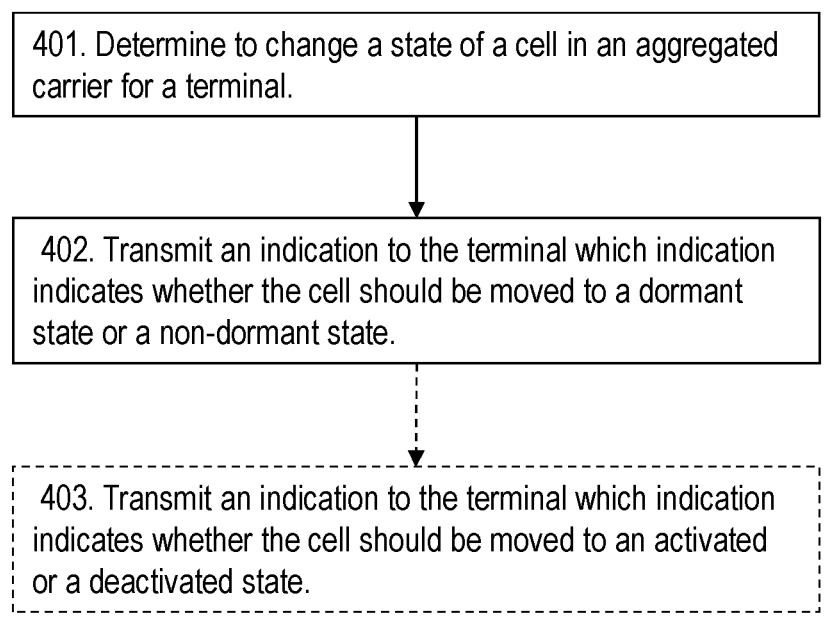
Fig. 6  Method in network node 110

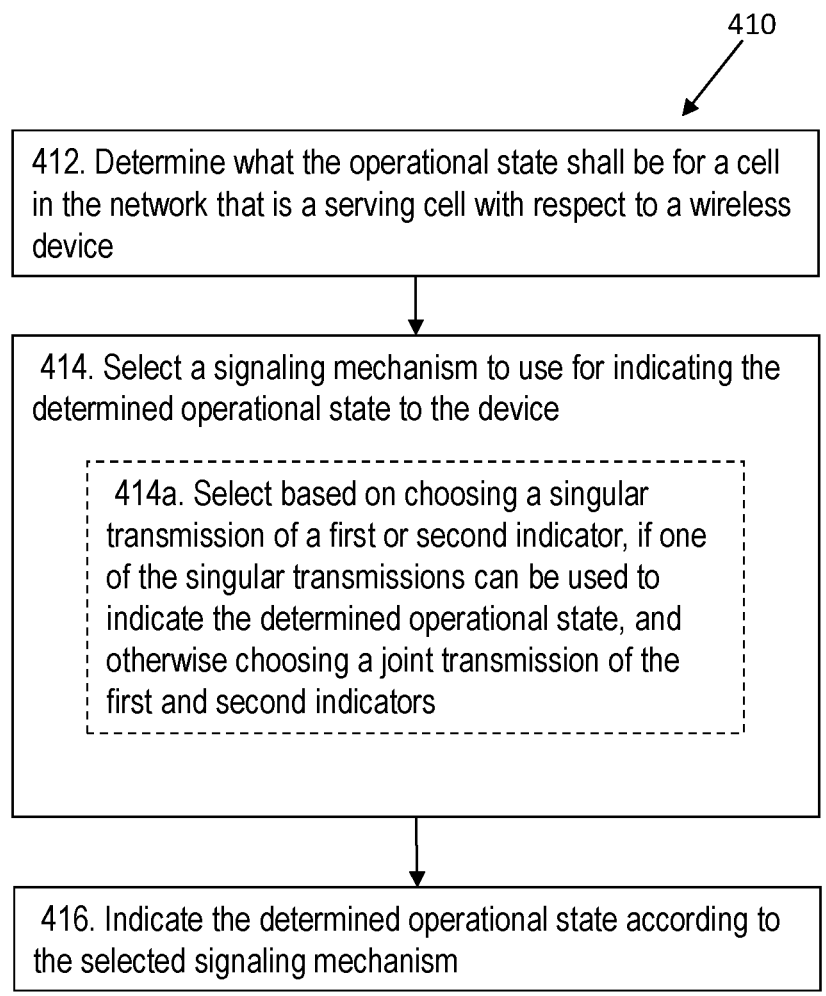
Fig. 6a Method in network node 110

METHODS AND APPARATUSES FOR DETERMINING OR INDICATING SERVING-CELL OPERATIONAL STATES, FOR A WIRELESS COMMUNICATION DEVICE

RELATED APPLICATIONS

This application is a continuation of U.S. application Ser. No. 16/975,263 filed 24 Aug. 2020, which is a U.S. National Phase of PCT/IB2019/051537 filed 26 Feb. 2019, which claims priority to U.S. Provisional Application No. 62/635,870 filed on 27 Feb. 2018. The entire contents of each aforementioned application is incorporated herein by reference.

TECHNICAL FIELD

The present disclosure relates to methods and apparatuses for determining or indicating what the operational state of a serving cell in a wireless communication network shall be for a wireless communication device.

BACKGROUND

Specifications promulgated by the Third Generation Partnership Project (3GPP) for so-called Fourth Generation (4G) networks define an Evolved Universal Terrestrial Radio Access Network (E-UTRAN) and its associated Long Term Evolution (LTE) air interface. Radio frequency (RF) carrier bandwidths of up to 20 MHz are provided for in the LTE specifications, with "Carrier Aggregation" or CA providing a mechanism for operating with even wider bandwidths.

With CA, the wireless communication network configures more than one "cell" as a serving cell for a wireless communication device. Here, each "cell" is represented by an LTE carrier of a defined bandwidth that provides service over a corresponding geographic area, but the term "cell" should be broadly understood as encompassing static or dynamic service areas, such as may be seen with beamforming or beam steering. Serving the device with more than one carrier increases the effective or aggregate bandwidth.

Example CA operations include the network configuring a set of cells for CA operation with respect to a device, including at least a Primary Cell (PCell) and up to four Secondary Cells (SCells). Radio Resource Control (RRC) signaling sent from the network to the device informs the device of the CA configuration details. Assuming a per-carrier bandwidth of 20 MHz, serving the device via one PCell and four SCells provides an effective or aggregate bandwidth of 100 MHz See FIG. 1 for a corresponding example.

However, CA operations allow the network to control the number of SCells in the CA configuration that are "activated" for the device at any given time. That is, although each SCell in the CA configuration is a "serving cell" of the device inasmuch as it is configured for such use in the CA context, the network controls whether respective ones of the SCells are in active use for communicating data between the network and the device.

Activation/deactivation control allows the network to control the number of cells that are activated for the device at any given time, e.g., in view of network conditions and communication service needs of the device. Because activation/deactivation control occurs on a faster basis than changes in the underlying CA configuration, the network uses Medium Access Control (MAC) signaling for activation/deactivation control signaling to the device.

Activation/deactivation control, therefore, provides the possibility for a 4G network to keep multiple cells configured for activation for a device on an as-needed basis. FIG. 2 illustrates an existing message type/format used in a 4G network context to activate/deactivate SCells for a device. Full details of the existing—i.e., "legacy" message—appear in Sections 5.13 and 6.1.3.8 of the 3GPP Technical Specification (TS) 36.321 V15.0.0.

According to those details, the legacy message comprises a MAC Control Element (CE) of one or four octets in length, containing "C" state-indication bits, with each "Ci" bit operating as a state indicator for the respective i-th one of the SCells in the CA configuration of the involved wireless communication device. As such, the legacy MAC CE may be regarded as a single-bit scheme, where, again, the legacy MAC CE carries a 1-bit flag or indicator per SCell in the CA configuration—referred to as the "legacy indicator". For example, the legacy MAC CE includes "C" bits, with each Ci bit corresponding to the i-th cell. The Ci bit set to "1" indicates that the corresponding i-th cell shall be activated for the device, and a "0" indicates that the i-th cell shall be deactivated for the device.

In addition to the activated and deactivated states, yet another state, a "dormant" state, may be introduced for SCells. However, the introduction of the "dormant" state raises certain challenges. Details regarding the dormant state are not settled, but the state represents something between the activated and deactivated states. According to one suggestion, a wireless communication device operating in the dormant state with respect to one of the SCells in its CA configuration would report Channel Quality Indicators (CQIs) for the cell but would not monitor downlink data and control channels of the cell, e.g., would not monitor the Physical Downlink Shared Channel (PDSCH) or the Physical Downlink Control Channel (PDCCH) for the cell.

Not monitoring the downlink data/control channels of the SCell reduces power consumption at the device and, at the same time, performing channel quality monitoring and reporting (CQI reporting) for the SCell speeds up transitioning the SCell to the activated state for the device. That is, moving the SCell to the activated state from the dormant state is faster than moving the SCell from the deactivated state to the activated state. Faster transitioning to the activated state reduces data transmission delays. The document R2-1802002, as submitted at Meeting #101 of the 3GPP Technical Specifications Group Radio Access Network Working Group 2 (TSG-RAN WG2), proposed adding a new MAC CE for moving a cell to and from the dormant state, where the new MAC CE would supplant the legacy MAC CE defined for activated/deactivated state control. See FIG. 3, for an illustration of the proposed MAC CE.

R2-1802002 suggests a new MAC CE that uses two (2) bits per SCell in the CA configuration of a wireless communication device, for indicating state transitions of the individual SCells for the device. See, e.g., the two "C1" bits forming a bit pair, the two "C2" bits forming a bit pair, and so on.

According to this proposed MAC CE, a "11" setting indicates that the cell shall be activated for the device, a "01" setting indicates that the cell shall be dormant for the device, and a "00" setting indicates that the cell shall be deactivated for the device. While the two-bit scheme proposed in R2-1802002 provides signaling mechanisms for transitioning an SCell in the CA configuration of a given device between all three states—activated, deactivated, and dormant—the scheme is incompatible with the aforementioned single-bit scheme embodied in the legacy MAC CE.

Thus, the proposed MAC CE requires changes to existing communication-network implementations that are based on the legacy MAC CE for activating and deactivating serving cells. Furthermore, the proposed MAC CE with its two-bits per SCell imposes additional signaling overhead as compared to the legacy MAC CE, because it requires signaling two bits per cell regardless of the state transitions being signaled.

SUMMARY

Example methods and apparatuses provide for the advantageous use of "first" and "second" indicators for cell state control with respect to a wireless communication device. When sent singularly, the first indicator indicates activated/deactivated state transitions according to corresponding sequential state transition logic implemented in the device, and the second indicator indicates activated/dormant state transitions according to corresponding sequential state transition logic implemented in the device. When sent jointly for a given serving cell of the device, the first and second indicators operate as a combinational pair that indicates what the operational state of the cell shall be for the device, irrespective of the current cell state. As an example, then, the foregoing "arrangement" allows the network to use single-bit per cell signaling for many state-control scenarios, including "normal" use of legacy activation/deactivation indicators, while also providing absolute state control via two-bit per cell signaling that does not depend on the current state of the cell.

In one example, a method of operation by a wireless communication device operating in a wireless communication network includes the device receiving a first indicator or a second indicator singularly or receiving both indicators jointly. In this context, a radio network node in the wireless communication network uses the first and second indicators to indicate what the operational state of a serving cell in the network shall be for the device. The operational state can be any one of an activated state, a deactivated state, and a dormant state, and the method includes the device determining the indicated operational state. Here, it should be noted that the operational state of the serving cell is from the perspective of the device—that is, the device operates with respect to the serving cell in accordance with the "state" of the cell, as determined by the device from the received indicator(s).

For joint reception of the first and second indicators, the method includes interpreting the first and second indicators jointly as a combination of values, according to which interpretation a first combination indicates the deactivated state, a second combination indicates the activated state, and a third combination indicates the dormant state. For singular reception of the first indicator, the method includes interpreting a first value of the first indicator as indicating the deactivated state, interpreting a second value of the first indicator as indicating no change in the operational state, if a current operational state is the dormant state or the activated state, and interpreting the second value of the first indicator as indicating the activated state, if the current operational state is the deactivated state. For singular reception of the second indicator, the method includes interpreting a first value of the second indicator as indicating the activated state, if a current operational state is the dormant state, interpreting the first value of the second indicator as indicating no change in the operational state, if the current operational state is not the dormant state, and interpreting a second value of the second indicator as indicating the dormant state.

The first and second indicators are respective binary variables, in one or more implementations. Further, in the same or in other implementations, the device recognizes the joint reception of the first and second indicators as receipt of the first and second indicators according to a defined temporal or logical linking. For example, first and second indicators for any number of serving cells of the device may be received in the same message, or in separate messages close in time. Correspondingly, the device recognizes the singular reception of the first indicator as receipt of the first indicator without receiving the second indicator according to the defined temporal or logical linking. Likewise, the device recognizes the singular reception of the second indicator as receipt of the second indicator without receiving the first indicator according to the defined temporal or logical linking. Saying that the device receives "the first indicator" or "the second indicator" should be understood as implying that the device receives the first or second indicator for each of the serving cells of the device that are subject to state control.

A corresponding apparatus example involves a wireless communication device configured for operation in a wireless communication network, such as one that provides a 4G or 5G Radio Access Network (RAN). The device includes communication circuitry, for wirelessly communicating with a radio network node of the network, including receiving a first indicator or a second indicator singularly or receiving both indicators jointly. In this context, the radio network node uses the first and second indicators to indicate what the operational state of a serving cell in the network shall be for the wireless communication device. In at least some embodiments, the serving cell is an SCell in a Carrier Aggregation (CA) configuration of the device, and it is regarded as a "serving cell" irrespective of whether it is currently activated for exchanging data with the device.

The operational state of the serving cell can be any one of an activated state, a deactivated state, and a dormant state. Again, these cell "states" indicate how the device is supposed to operate with respect to the cell, and the device includes processing circuitry that is operatively associated with the communication circuitry and configured to determine the indicated operational state.

For joint reception of the first and second indicators, the processing circuitry is configured to interpret the first and second indicators jointly as a combination of values, according to which interpretation a first combination indicates the deactivated state, a second combination indicates the activated state, and a third combination indicates the dormant state. For singular reception of the first indicator, the processing circuitry is configured to interpret a first value of the first indicator as indicating the deactivated state, interpret a second value of the first indicator as indicating no change in the operational state, if a current operational state is the dormant state or the activated state, and interpret the second value of the first indicator as indicating the activated state, if the current operational state is the deactivated state. For singular reception of the second indicator, the processing circuitry is configured to interpret a first value of the second indicator as indicating the activated state, if a current operational state is the dormant state, interpret the first value of the second indicator as indicating no change in the operational state, if the current operational state is not the dormant state, and interpret a second value of the second indicator as indicating the dormant state.

One advantage of the indicator scheme described immediately above is that the network can use single-bit per cell indicators for signaling at least some cell-state transitions, in dependence on the state-based logic implemented at the device for single-indicator reception scenarios and can use two-bit per cell indicators for signaling cell-state transitions independent of the current cell state. In a corresponding example, a method of operation at a radio network node configured for operation in a wireless communication network includes determining what the operational state of a serving cell in the network shall be for a wireless communication device. The operational state can be any one of an activated state, a deactivated state, and a dormant state.

The example method includes the radio network node selecting a signaling mechanism to use for indicating the determined operational state to the device, by choosing from among a singular transmission of a first indicator, a singular transmission of a second indicator, or a joint transmission of both indicators. Correspondingly, the method includes the radio network node indicating the determined operational state to the device, using the selected signaling mechanism. In at least some embodiments, the first and second indicators are each a single-bit indicator, at least on a per-cell basis. That is, for a device configured to have some number of cells available as serving cells, the first or second indicators may each comprise a bit map, where each bit position corresponds to one of the cells and where the state of the bit in each bit position indicates what the operational state of the cell shall be for the device.

For the joint transmission of both indicators, a first combination of values of the first and second indicators indicates the deactivated state, a second combination indicates the activated state, and a third combination indicates the dormant state. For the singular transmission of the first indicator, a first value indicates the deactivated state, a second value indicates no change in the operational state, if the current operational state is the dormant state or the activated state, and the second value indicates the activated state, if the current operational state is the deactivated state. For the singular transmission of the second indicator, a first value indicates the activated state, if the current operational state is the dormant state, the first value indicates no change in the operational state, if the current operational state is not the dormant state, and a second value indicates the dormant state.

The method may further include the radio network node choosing one of the singular transmissions, if one of the singular transmissions can be used to indicate the determined operational state, in view of the current operational state, and otherwise choosing the joint transmission. In the same or other embodiments of the method, each singular transmission comprises transmitting one of the first and second indicators without transmitting the other one of the first and second indicators according to a defined temporal or logical linking of the first and second indicators. Joint transmission of the first and second indicators comprises transmitting the first and second indicators according to the defined temporal or logical linking of the first and second indicators. Again, all such transmissions may be made with respect to a single cell, or with respect to each cell among a set of cells configured for use as serving cells of the device. For example, the radio network node sends a message that includes a single-bit indicator for each of the cells or sends a message that includes a pairing of single-bit indicators for each cell.

In a corresponding apparatus example, a radio network node is configured for operation in a wireless communication network and includes communication circuitry configured for wirelessly communicating with a wireless communication device, and processing circuitry operatively associated with the communication circuitry. The processing circuitry is configured to determine what the operational state of a serving cell in the network shall be for the device, where the operational state can be any one of an activated state, a deactivated state, and a dormant state. Further, the processing circuitry is configured to select a signaling mechanism to use for indicating the determined operational state to the device, by choosing from among a singular transmission of a first indicator, a singular transmission of a second indicator, or a joint transmission of both indicators, and indicate the determined operational state to the device, using the selected signaling mechanism.

For the joint transmission of both indicators, a first combination of values of the first and second indicators indicates the deactivated state, a second combination indicates the activated state, and a third combination indicates the dormant state. For the singular transmission of the first indicator, a first value indicates the deactivated state, a second value indicates no change in the operational state, if the current operational state is the dormant state or the activated state, and the second value indicates the activated state, if the current operational state is the deactivated state. For the singular transmission of the second indicator, a first value indicates the activated state, if the current operational state is the dormant state, the first value indicates no change in the operational state, if the current operational state is not the dormant state, and a second value indicates the dormant state.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a diagram of an example Carrier Aggregation (CA) configuration, in which the aggregation of five 20 MHz carriers—referred to as "cells"—provides an aggregated bandwidth of 100 MHz FIG. 2 is a diagram of a known Medium Access (MAC) Control Element (CE), which provides a single-bit indicator per serving cell in a CA configuration, for use by a radio network node in indicating to the involved wireless communication device whether each cell shall be treated by the device as being "activated" or "deactivated".

FIG. 3 is a diagram of a known MAC CE that uses two bits per serving cell in the CA configuration of a wireless communication device, for indicating whether each cell shall be treated by the device as being activated, deactivated, or "dormant".

FIG. 5 is a logic flow diagram of one embodiment of a method performed by a wireless communication device, according to one or more of the embodiments contemplated herein.

FIG. 5a is a logic flow diagram of another or more detailed embodiment of a method performed by a wireless communication device, according to one or more of the embodiments contemplated herein.

FIG. 6 is a logic flow diagram of one embodiment of a method performed by a radio network node, according to one or more of the embodiments contemplated herein.

FIG. 6a is a logic flow diagram of another or more detailed embodiment of a method performed by a radio network node, according to one or more of the embodiments contemplated herein.

FIG. 7 is a block diagram of an example embodiment of a wireless communication device, such as may perform the method(s) of FIGS. 5 and/or 5a.

FIG. 8 is a block diagram of an example embodiment of a radio network node, such as may perform the method(s) of FIGS. 6 and/or 6a.

DETAILED DESCRIPTION

One or more of the following example embodiments provide for full three-state control of a cell for a wireless communication device—activated, deactivated, and dormant—while retaining compatibility with use of the legacy MAC CE used for two-state activated/deactivated control. That is, among other advantages, the example methods and apparatuses described herein provide for the use of the legacy MAC CE for moving serving cells of a given wireless communication device between activated and deactivated states, along with providing for the use of a further MAC CE for moving the cells to/from a dormant state. Such an approach requires no changes to the existing and developing 4G and 5G network standards, or requires only minor adjustments, hence saving implementation efforts and costs.

Figure 4:
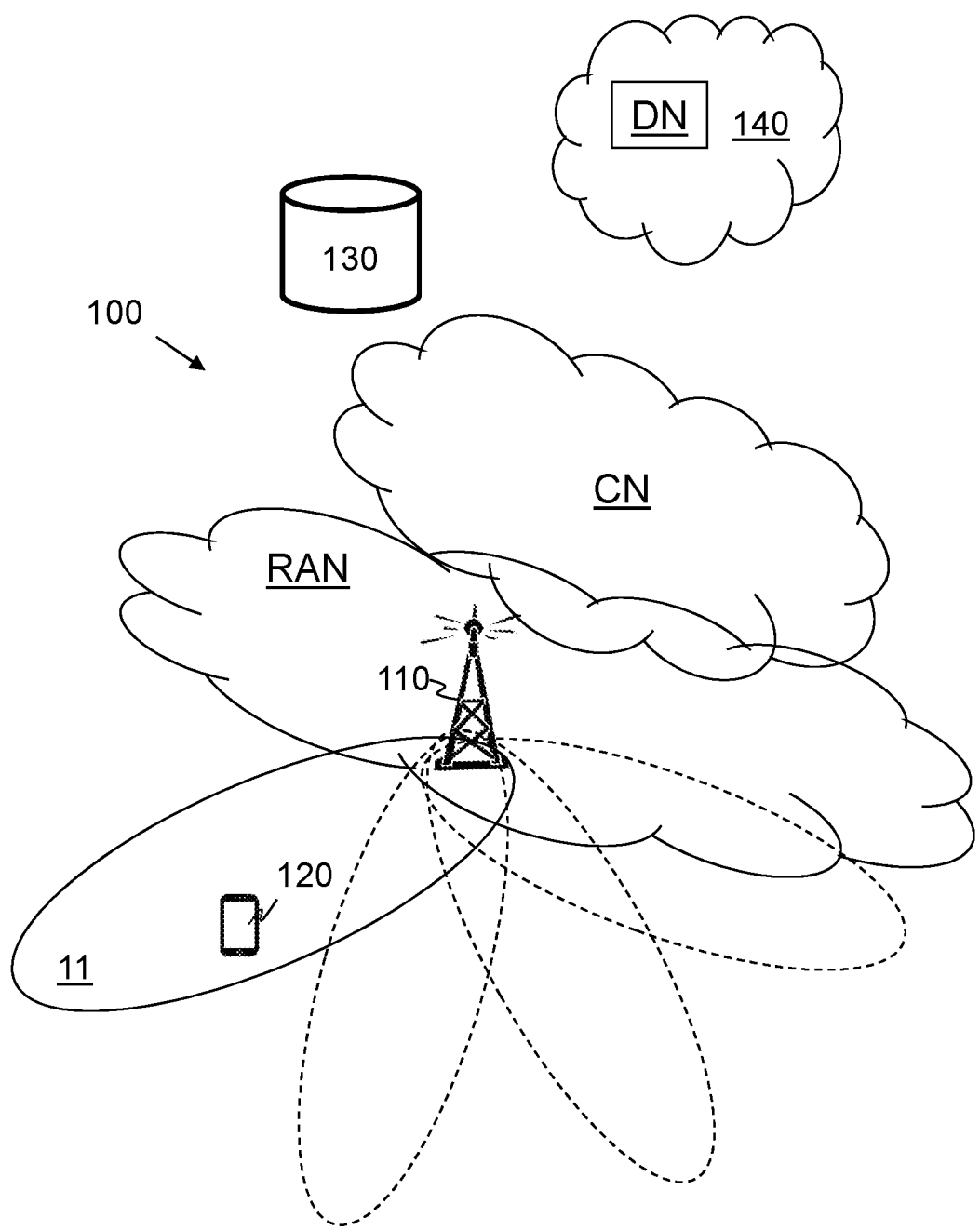
FIG. 4 is a block diagram of one embodiment of a wireless communication network that includes a radio network node configured according to one or more of the embodiments contemplated herein.

Embodiments herein relate to wireless communication networks in general. FIG. 4 is a schematic overview depicting a wireless communications network 100. The wireless communications network 100 comprises one or more RANs and one or more Core Networks (CNs). The wireless communications network 100 may use a number of different technologies, such as Wi-Fi, Long Term Evolution (LTE), LTE-Advanced, 5G New Radio (NR), Wideband Code Division Multiple Access (WCDMA), Global System for Mobile communications/Enhanced Data rate for GSM Evolution (GSM/EDGE), Worldwide Interoperability for Microwave Access (WiMAX), or Ultra Mobile Broadband (UMB), just to mention a few possible implementations. Embodiments herein relate to recent technology trends that are of in the 5G context. However, at least some of the embodiments are also applicable in the further development of older types of wireless communication systems, such as, e.g. WCDMA and LTE.

In the wireless communication network 100, wireless communication devices 120 communicate via one or more Access Networks (ANs), e.g., RANs, to one or more core networks (CN). It should be understood by the skilled in the art that "wireless communication device" is a non-limiting term which means any terminal, wireless communication terminal, user equipment, Machine Type Communication (MTC) device, Device to Device (D2D) terminal, or node, e.g., such as smartphones, laptops, mobile phones, sensors, relays, mobile tablets, or even a small base stations communicating within one or more cells of the network 100. The example wireless communication devices 120 shown in FIG. 1 also may be referred to as "devices 120" or as "User Equipments 120" or "UEs 120". Although the terms "user equipment" and "UE" are used in the various 3GPP specifications to refer to wireless communication devices that are configured to communicate with radio network nodes of the involved 3GPP RANs, those terms should be understood as having a broad meaning herein. Thus, a "UE" or "device" refers to any wireless communication apparatus that is configured to communicate with the radio network node(s) of the wireless communication network 100.

The wireless communications network 100 comprises at least one radio network node 110 providing radio coverage over at least one corresponding geographical area, referred to as a service area 11. The service area 11 may be static or dynamic, and it may be "formed" using beamforming, e.g., it may correspond to one or more transmission or reception beams, or beam groups, of a radio access technology (RAT), such as 5G, LTE, Wi-Fi, etc. This disclosure uses the term "cell" broadly to connote the use or allocation of certain radio resources—e.g., time/frequency resources—for providing communication services over or within a given service area 11, and it should be understood that such resources may be comprised in a particular radio frequency (RF) carrier. As such, the terms "carrier", "cell", and "beam" or "beam group", all may be used interchangeably to refer to a given service area or areas, unless otherwise noted.

For convenience, the term "cell 11" is also used herein. Further, a given geographic position may covered by one cell 11 or by two or more cells 11, e.g., where the radio coverage of two or more cells 11 overlap the geographic position.

In an example embodiment, the radio network node 110 is a Next Generation (NG) node—i.e., a node configured to use the NR interface contemplated for 5G network operation. Broadly, the radio network node 110 may operate as a transmission/reception point, a base station, a radio access network node such as a Wireless Local Area Network (WLAN) access point or an Access Point Station (AP STA), an access controller, a base transceiver station, a radio remote unit (RRU), a base station router, a transmission arrangement of a radio base station, a stand-alone access point, or any other network unit capable of communicating with a wireless device within a service area 11 served by the network node 110, according to the air interface implemented by the radio network node 110.

The radio network node 110 may provide multiple cells—e.g., by providing multiple beams or using multiple carriers occupying different frequency positions in the radio spectrum—or there may be one or more neighboring radio network nodes providing cells that, in terms of geographic coverage area, overlap or abut the cell(s) provided by the illustrated radio network node 110. Regardless of the particulars, it will be appreciated that a UE 120 at a given geographic location may experience sufficient signal strength or quality with respect to more than one cell and hence, be servable from more than one cell. Any radio network node that provides a cell configured for serving the UE 120 may be referred to as a "serving node" for the UE 120. It will be understood that the radio network node 110 communicates with the UE 120 via Downlink (DL) transmissions to the UE 120 and Uplink (UL) transmissions from the UE 120. One or more core network nodes 130 operate in CN and support communications with the UE 120.

One or more of the various method-based embodiments disclosed herein may be performed by the radio network node 110 or a core network node 130. As an alternative, a Distributed Node (DN) and functionality, e.g., comprised in a cloud 140 as shown in FIG. 1, may be used for performing or partly performing the contemplated network-side operations. For example, if the MAC layer used for communicating with the UE 120 is located in the cloud 140, then all or some of the network-side operations described herein may also be implemented in the cloud 140.

A further point regarding terminology herein is that the term "serving cell" denotes a cell in the network 100 that a UE 120 has been configured to use. That is, a given cell may be a "serving cell" with respect to one UE 120 but not with respect to another UE 120. Moreover, although a given cell may be referred to as a "serving cell," it need not be in the activated state to be considered a "serving" cell. For example, for a UE 120 having a Carrier Aggregation (CA) configuration that includes one PCell and one or more SCells, the PCell, which is always "activated" for the UE 120, is a serving cell and each of the SCells are also serving cells regardless of whether it is in the "activated" state for the UE 120.

According to the embodiments herein there may be two types of MAC CEs, e.g., the legacy MAC CE as a first type, and "dormancy" MAC CE as a second type. Both types of MAC CEs may have the same format, e.g., a single-bit state indicator for each cell that is subject to state control for the UE 120. The legacy MAC CE, when transmitted "singularly", may be used for moving individual cells between the activated and the deactivated states for a UE 120, largely in keeping with the state details seen in Section 6.1.3.8 of 3GPP TS 36.321 V15.0.0. The dormancy MAC CE, when transmitted "singularly", may be used for moving individual cells to/from the dormant state, for a UE. These two control schemes depend on the UE 120 implementing advantageous sequential-logic control schemes whereby it interprets the legacy MAC CE as an activation/deactivation control for respective serving cells, in dependence on the current states of those cells, and interprets the dormancy MAC CE as a dormancy control for respective serving cells, in dependence on the current states of those cells.

However, when the legacy and dormancy MAC CEs are transmitted jointly, e.g., such as when they are transmitted together close in time or multiplexed in the same message, the UE 120 interprets the two MAC CEs jointly, according to defined combinational logic that does not depend on the current cell states. That is, under the joint interpretation, the UE 120 interprets the bit indicator for cell Ci in the legacy MAC CE jointly with the bit indicator included in the dormancy MAC CE for the same i-th cell. As such, the contemplated arrangement allows the radio network node 120 to send the legacy MAC CE as a singular transmission that includes a single-bit activated/deactivated state indicator for each of one or more serving cells of the UE 120, or send the dormancy MAC CE as a singular transmission that includes a single-bit dormancy indicator for each of the one or more serving cells of the UE 120, or send both types of MAC CEs jointly, such that the corresponding per-cell state indicators of the two MAC CEs are interpreted as a combination of bit values.

At least when the serving cells of a given UE 120 are in any of one or more certain current states for the UE 120, the desired activated/deactivated states of those cells can be set using a singular transmission of the legacy MAC CE Similarly, at least when the serving cells are in any of one or more certain current states for the UE 120, the desired dormancy state—dormant or not dormant—of those cells can be set using a singular transmission of the dormancy MAC CE. To the extent that any of the serving cells cannot be transitioned to the desired next state for the UE 120 according to the state-dependent sequential logic associated with the singular transmission of either the legacy or dormancy MAC CEs, the radio network node 110 can perform a joint transmission of the legacy and dormancy MAC CEs, according to which the UE 120 applies a joint interpretation to the per-cell indicators in the two MAC CEs as a joint value, with each joint value indicating what the operational state of the corresponding serving cell shall be for the UE 120, irrespective of the current operational state of the cell.

For example, each of the legacy and dormancy MAC CEs includes a set of bit positions or a bitmap, with each position used to carry a bit value serving as an indicator for a respective cell or cell index. Each serving cell—or, at least each SCell in the CA configuration of the UE 120—is controlled by a respective one of the bit positions. In this sense, the legacy MAC CE can be understood as conveying a "first indicator" for each cell subject to state control for the UE 120 and the dormancy MAC CE can be understood as carrying a "second indicator" for each such cell. When the UE 120 receives the legacy MAC CE as a singular transmission, it interprets each included first indicator according to the sequential logic defined in the UE 120 for singular reception of the legacy MAC CE. When the UE 120 receives the dormancy MAC CE as a singular transmission, it interprets each included second indicator according to the sequential logic defined in the UE 120 for singular reception of the dormancy MAC CE. When the UE 120 receives the legacy MAC CE and the dormancy MAC CE jointly, it interprets the bit value for a given cell in the legacy MAC CE and the bit value in the dormancy MAC CE for the same given cell together, as a combinational value.

Note that references to the "legacy MAC CE", e.g., saying that the legacy MAC CE is transmitted or received, does not mean that the radio network node 110 and/or the UE 120 use, interpret, or apply the legacy MAC CE exactly as applied according to the previous convention. That is, in the context of this disclosure, the legacy MAC CE may be used during times it can be used singularly, to effectuate the desired cell-state control for a given UE 120. Whether or not the legacy MAC CE can be used at any given time to carry out the desired cell-state control depends on the cell-state transitions decided by the radio network node 110 and the current state(s) of the serving cell(s) being state-controlled for the UE 120. Similarly, whether or not the dormancy MAC CE can be used at any given time to carry out the desired cell-state control depends on the cell-state transitions decided by the radio network node 110 and the current state(s) of the serving cell(s) being state-controlled for the UE 120.

In instances where the cell-state control cannot be effectuated by singular transmission of either the legacy MAC CE or the dormancy MAC CE, the radio network node 110 performs a joint transmission of the legacy and MAC CEs, with the respective (same-cell) bits in each CE set as combinational values that indicate what the cell state shall be for the device, for each of the serving cells subject to state control. For example, in a scenario in which the UE 120 receives a first MAC CE, such as the legacy MAC CE and a second MAC CE, such as the dormancy MAC CE: if the first MAC CE contains a 1 for a serving cell and the second MAC CE indicates a 1 for a serving cell, the UE 120 moves the serving cell to the dormant state. If the first MAC CE contains a 1 for a serving cell and the second MAC CE indicates a 0 for a serving cell, the UE 120 moves the serving cell to an activated state. If the first MAC CE contains a 0 for a serving cell and the second MAC CE indicates a 1 for a serving cell, or if the first MAC CE contains a 0 for a serving cell and the second MAC CE indicates a 0 for a serving cell, the UE 120 moves the serving cell to the deactivated state.

Among the possible state-dependent actions taken by the UE 120 in response to receiving an indication, the UE 120 may only consider an indication for a serving cell in the dormant MAC CE, if the serving cell is in an activated state. For example, if the UE 120 receives a second MAC CE, such as the dormancy MAC CE, in a singular transmission, for each serving cell which is activated for the UE 120: if the second MAC CE indicates a 1 for a given one of the serving cells, the UE 120 moves the cell to the dormant state, and, if the second MAC CE indicates a 0 for the given serving cell, the UE 120 moves the cell to the activated state.

According to a further embodiment herein, which involves history-dependent decoding (interpretation) of cell-state indicators at the UE 120, the UE 120 may receive a message, and the message may indicate a first and a second value for a serving cell. If a first value is indicated the UE 120 moves a serving cell to a first state, but if a second value is indicated the UE 120 moves the serving cell to either a second state or a third state. Which of the second and third state the UE 120 moves the serving cell to may depend on which state the cell was prior to entering the first state.

For example, if a certain type of MAC CE is received singularly and it indicates a first value for a cell (e.g., the value of "1") the UE 120 interprets the value as indicating that the cell should be moved to a dormant state. If the MAC CE indicates a second value for a cell (e.g., 0) that means that the cell should be moved away from a dormant state and the UE 120 moves the cell either to an activated state or to a deactivated state, and which of these states the UE 120 moves the cell to may depend on which state the cell was in prior to being in the dormant state. For example, if the cell was in the activated state prior to entering the dormant state, the UE 120 moves the cell to the activated state, but if the cell was in the deactivated state prior to entering a dormant state, the UE 120 moves the cell to the deactivated state.

Broadly, in one or more embodiments, the UE 120 remembers which state a serving cell was in prior to entering the dormant state. In one example embodiment, if the UE 120 receives the dormancy-state MAC CE as a singular transmission and the bit for the serving cell is a "1", if the serving cell currently is in a state other than a dormant state, such as, e.g., in the activated or the deactivated state, the UE 120 moves the serving cell to the dormant state. However, the UE 120 makes no state change for the serving cell, if the current state of the serving cell is the dormant state. If the UE receives the dormancy state MAC CE as a singular transmission and the included bit for a given serving cell is a "0", if the serving cell is currently in a state other than a dormant state, such as, e.g., in the activated or the deactivated state, the UE 120 makes no state change for the serving cell. However, if the serving cell is currently in the dormant state and if the serving cell was in the deactivated state prior to entering the dormant state, the UE 120 moves the cell to the deactivated state. If the serving cell was in an activated state prior to entering the dormant state, the UE 120 moves the serving cell to the activated state.

Note that even if the UE 120 does not initiate a state change regarding the serving cell, the UE 120 may perform other actions related to the state the cell is in, such as, e.g., start/restart timers, etc. Thus, signaling from the radio network node 110 that does not result in a state change for the serving cell may nonetheless be needed or useful, for the operation of the UE 120 with respect to the cell. More specifically, in one or more embodiments of the UE 120, instances where the singular reception of a first or second indicator for an SCell is interpreted by the UE 120 as representing no change in the current state of the SCell, the UE may trigger one or more actions on reception of the indicator, such as starting or restarting certain timers for the SCell, triggering certain reporting for the SCell, etc. For example, if the UE 120 receives a first indicator set to a "1" for an SCell that is already in the activated state, the UE 120 starts/restarts a cell-deactivation timer for the SCell and/or triggers one or more reports for the SCell.

If the radio network node 110 wants to move a serving cell to the dormant state for the UE 120, it may send the dormancy MAC CE as a singular transmission, with the control bit for the serving cell being a "1". If the cell is in the dormant state and was in the activated state prior to entering the dormant state, the radio network node 110 may cause the UE 120 to move the cell to the activated state by sending a dormancy MAC CE indicating a 0, in a singular transmission of the dormancy MAC CE. If the eNB wants to move the cell to the deactivated state, the eNB may send an activation/deactivation MAC CE indicating a 0 for the cell in order to indicate that the cell should be moved to the deactivated state. Alternatively, the eNB may first send a dormancy MAC CE indicating a 0, thereby making the cell move to the activated state and after that, the radio network node may move the cell to the deactivated state by using an activation/deactivation MAC CE.

For single direction dormancy MAC CE transitions, according to a further embodiment, if the UE 120 receives the MAC CE for dormant state transitions—the dormancy MAC CE—and the MAC CE indicates a first value, such as, e.g., 1, the UE 120 may move the corresponding cell to the dormant state, but if a second value is indicated, such as e.g., 0, the UE 120 may perform no action. In order to move the cell away from the dormant state another type of indication, such as, e.g., an additional MAC CE, may be used. For example, an activation/deactivation MAC CE may be used for moving the cell from a dormant state to an activated state and to a deactivated state.

In a working example, if the UE 120 receives the MAC CE: if the MAC CE indicates the value 1 for a serving cell: the UE 120 moves the cell to dormant state; otherwise, the UE 120 does not change the cell state.

If the radio network node 110 wants to move a cell into the dormant state, it may send a MAC CE which indicates for a cell, such as, e.g., by having a bit associated with the cell set to 1, that the cell should be moved to the dormant state. However, if the cell should be moved from the dormant state to the activated state or to the deactivated state the radio network node 110 may send another type of MAC CE indicating that a cell should be moved to activated (e.g., by setting a bit corresponding to a cell to the value 1) or to deactivated (e.g., by setting a bit corresponding to the cell to a value 0).

FIG. 5 shows an example method in the terminal, such as, e.g. in the UE 120, e.g., for controlling a state, such as, e.g. activated, deactivated and/or dormant state, of a cell which may be comprised in an aggregated carrier in a wireless communications network 100.

In the following, method steps according to embodiments herein will be described in more detail.

Action 301

The terminal obtains a first indication indicating whether the cell should be moved to, currently is in or has been in an activated or a deactivated state.

In one embodiment the first indication may be obtained by receiving a first Medium Access Control Element (MAC CE) from a network node, such as, e.g. an eNB 110, wherein the first MAC CE comprises the first indication indicating that the cell should be moved to an activated or a deactivated state.

In one embodiment the first indication may be obtained by retrieving a current state which the cell is in. The terminal may be aware of the current state of the cells and/or may retrieve the first indication, e.g. from a storage, such as, e.g. a memory.

In one embodiment the first indication may be obtained by retrieving a current state which the cell is in and retrieving a previous state which the cell has been in. The terminal may be aware of the current and/or the previous state of the cells and/or may retrieve the current and/or the previous state from a storage, such as, e.g. a memory.

Action 302

The terminal receives a second indication indicating whether the cell should be moved to a dormant state or a non-dormant state. The second indication may, e.g. be received from a network node, such as, e.g. the eNB (110), such as, e.g., in a MAC CE.

Action 303

The terminal determines a state of the cell based on the first and the second indication.

When the terminal has received the first indication from the network node, the terminal may determine the state of the cell to be in an activated state when the first indication indicates an activated state and the second indication indicates a non-dormant state, in a dormant state when the first indication indicates an activated state and the second indication indicates a dormant state and, in a deactivated state when the first indication indicates a deactivated state and the second indication indicates a dormant or a non-dormant state.

When the terminal has obtained the first indication by retrieving it, the terminal may only use the second indication to determine the state of the cell based on the second indication when the cell is currently in an activated state. In other words, if the cell is currently in a deactivated state, the terminal does not consider the second indication relating to the dormant state and the cell stays in the deactivated state. However, when the cell is in the activated state the terminal determines the cell to be in an activated state when the second indication indicates a non-dormant state and in a dormant state when the second indication indicates a dormant state.

When the terminal has obtained the first indication by retrieving a current state which the cell is in and retrieving a previous state which the cell has been in, the terminal may determine the cell to be in a dormant state when the cell currently is in an activated, a deactivated or dormant state and the second indication indicates a dormant state. The terminal may further determine the cell to be in an activated state when the cell currently is in an activated state and the second indication indicates a non-dormant state. The terminal may further determine the cell to be in an activated state when the cell currently is in an activated state and the second indication indicates a non-dormant state. The terminal may further determine the cell to be in a deactivated state when the cell currently is in an activated state and the second indication indicates a non-dormant state. The terminal may further determine the cell to be in an activated state when the cell currently is in a dormant state, previously has been in an activated state and the second indication indicates a non-dormant state. The terminal may further determine the cell to be in a deactivated state when the cell currently is in a dormant state, previously has been in a deactivated state and the second indication indicates a non-dormant state.

Action 304

The terminal may further change, which may herein also be referred to as move the state of the cell to the determined state.

FIG. 5a illustrates further example details for a method 310 of operation at a wireless communication device, e.g., a UE 120, that is operating in a wireless communication network 100. The method 310 includes the device receiving (Block 312) a first indicator or a second indicator singularly or receiving both indicators jointly. Here, a radio network node 110 in the wireless communication network 100 uses the first and second indicators to indicate what the operational state shall be for a serving cell 11 in the network 100, for the device. The operational state can be any one of an activated state, a deactivated state, and a dormant state.

It should be appreciated that the above references to receiving a first or second indicator singularly or receiving first and second indicators jointly, adopt a per-cell perspective. That is, the device may receive a singular transmission of first indicators, each one corresponding to a respective one of the serving cells of the device that are subject to state control, e.g., all of the currently-configured SCells in a CA configuration of the device. Similarly, the device may receive a singular transmission of second indicators, each one corresponding to a respective one of the serving cells of the device that are subject to state control. Or the device may receive first and second indicators jointly, where each first indicator has a bit position or other logical structure that maps it to a respective one of the serving cells of the device, and each second indicator likewise maps to a respective one of the serving cells, such that the first and second indicators that map to the same cell form a combinational pair.

By way of example, the first indicators are conveyed in a MAC CE structured as the aforementioned legacy MAC CE, i.e., a bitmap of single-bit fields, with each bit field being a 1-bit indicator for a respective one of the serving cells of the device. As a further example, the second indicators are conveyed in a MAC CE structured as the aforementioned dormancy MAC CE, with each bit field being a 1-bit indicator for a respective one of the serving cells of the device. Thus, a singular reception of a legacy MAC CE at the device effects activation/deactivation control, subject, however, to dependence on the current cell states. Similarly, a singular reception of a dormancy MAC CE at the device effects dormancy control, subject, however, to dependence on the current cell states. If the desired state transition for all cells being controlled for the device cannot be carried out via a singular transmission of either the legacy MAC CE or the dormancy MAC CE, the radio network node 110 performs a joint transmission of the two MAC CEs, where the combinational values of the respective bit pairs from the two MAC CEs tell the device what the operational state of the corresponding cell shall be for the device, irrespective of the current state of the cell.

Referring back to the method 310 for relevant corresponding details, the method 310 includes the device determining (Block 314) the indicated operational state as (a) for joint reception of the first and second indicators (Block 314a), interpreting the first and second indicators jointly as a combination of values, according to which interpretation a first combination indicates the deactivated state, a second combination indicates the activated state, and a third combination indicates the dormant state; (b) for singular reception of the first indicator (Block 314*b*), interpreting a first value of the first indicator as indicating the deactivated state, interpreting a second value of the first indicator as indicating no change in the operational state, if a current operational state is the dormant state or the activated state, and interpreting the second value of the first indicator as indicating the activated state, if the current operational state is the deactivated state; and (c) for singular reception of the second indicator (Block 314*c*), interpreting a first value of the second indicator as indicating the activated state, if a current operational state is the dormant state, interpreting the first value of the second indicator as indicating no change in the operational state, if the current operational state is not the dormant state, and interpreting a second value of the second indicator as indicating the dormant state.

Taking the example case of receiving a singular transmission of first indicators by the device, where the device in one or more embodiments receives the legacy MAC CE containing a bit flag or indicator per SCell included in the CA configuration of the device. Each such per-cell indicator is a "first indicator" for the respective cell. Assuming that a flag or bit value of "0" indicates the deactivated state and a flag or bit value of "1" indicates the activated state, the device in one or more embodiments responds as follows, for each cell: the device interprets a value of "0" as indicating the deactivated state, irrespective of the current state of the cell, interprets a value of "1" as indicating the activated state, if the current state of the cell is deactivated, and interprets the value of "1" as indicating no change in the operational state if the current state of the cell is dormant or activated.

However, interpreting an indicator as indicating "no change" in operational state for a cell does not mean that the device necessarily ignores the indicator or takes no action with respect to the cell. For example, if the current state of a cell is the activated state and the device receives a first indicator indicating that the state of that cell shall be the activated state, the device may, effectively, "re-activate" the cell by restarting the timers used for deactivation control, trigger certain reporting for the cell, etc.

Thus, for singular reception of the legacy MAC CE for activation/deactivation control of the SCells in the CA configuration of the device, an example device contemplated herein may be understood as implementing the following logic for each such cell: a "0" indicates that the device should treat the cell as deactivated, a "1" indicates that the cell should remain in the dormant state if the cell currently is dormant, or a "1" indicates that the cell should be activated if the cell currently is deactivated, or a "1" indicates that cell should be "re-activated" if the cell is currently activated. Again, although the re-activation does not change the operational state of the cell inasmuch as the current and next states of the cell for the device are both the activated state, re-activation operations by the device may include the device restarting one or more cell-state timers used by the device for the cell and/or may trigger one or more reports from the device regarding the cell.

In at least one implementation of the method 310, the first and second indicators are respective binary variables, e.g., a 1-bit indicator corresponding to a particular one of the serving cells of the device that are subject to state control.

In another example detail, the device recognizes the joint reception of the first and second indicators as receipt of the first and second indicators according to a defined temporal or logical linking, recognizes the singular reception of the first indicator as receipt of the first indicator without receiving the second indicator according to the defined temporal or logical linking, and recognizes the singular reception of the second indicator as receipt of the second indicator without receiving the first indicator according to the defined temporal or logical linking. The defined logical linking comprises, for example, the inclusion of the first and second indicators in the same message, as transmitted by the radio network node 110 and received at the device.

The method 310 may also include adapting the operation of the device with respect to the serving cell, according to the indicated operational state of the serving cell. That is, the device receives a first and/or second indicator for each serving cell subject to state control for the device, and it adapts its operation with respect to each such cell based on the value(s) of the first and/or second indicators received for that cell.

In one or more embodiments, each of the first and second indicators is a Medium Access Control (MAC) Control Element used by MAC-layer processing performed by the device.

FIG. 6 shows an example method in a radio network node 110, such as a 4G eNB or a 5G gNB, for controlling a state of a cell for a UE 120 or any other device. Again, the cells in question may be a set of one or more SCells included in a CA configuration of the UE 120.

Action 401

The network node determines to change a state of a cell in an aggregated carrier for the terminal. A cell shall herein be interpreted as one or more cells.

Action 402

The network node transmits an indication to the terminal, such as, e.g. the UE (110), which indication indicates whether the cell should be moved to a dormant state or a non-dormant state. This indication corresponds to the second indication received by the terminal in action 302.

Action 403

The network node may further transmit an indication indicating whether the cell should be moved to an activated or a deactivated state. This indication corresponds to the first indication received by the terminal in action 301*a*.

FIG. 6*a* illustrates further example operations by a radio network node 110, by depicting a method 410 that may be implemented by the radio network node 110 or by some other type of node in the wireless communication network 100. The method 410 includes determining (Block 412) what the operational state of a serving cell 11 in the network 100 shall be for a wireless communication device, e.g., a UE 120. The operational state can be any one of an activated state, a deactivated state, and a dormant state.

The method 410 further includes the node selecting (Block 414) a signaling mechanism to use for indicating the determined operational state to the device, by choosing (Block 414*a*) from among a singular transmission of a first indicator, a singular transmission of a second indicator, or a joint transmission of both indicators. The method further includes the node indicating (Block 416) the determined operational state to the device, using the selected signaling mechanism. If the node performing the method is the radio network node 110, the indicating step comprises, for example, the radio network node 110 performing a downlink transmission targeting the device. If the node performing the method is not a radio network node in communication with the device over the air interface, then indicating the determined operational state to the device via the selected signaling mechanism comprises, for example, sending initiating signaling via a computer or network interface to a radio network node, or to another node associated with a radio network node. The initiating signaling indicates, for example, the determined state(s) and selected signaling mechanism.

As described above, for the joint transmission of both indicators, a first combination of values of the first and second indicators indicates the deactivated state, a second combination indicates the activated state, and a third combination indicates the dormant state; for the singular transmission of the first indicator, a first value indicates the deactivated state, a second value indicates no change in the operational state, if the current operational state is the dormant state or the activated state, and the second value indicates the activated state, if the current operational state is the deactivated state; and, for the singular transmission of the second indicator, a first value indicates the activated state, if the current operational state is the dormant state, the first value indicates no change in the operational state, if the current operational state is not the dormant state, and a second value indicates the dormant state.

The step of choosing comprises, for example, choosing one of the singular transmissions, if one of the singular transmissions can be used to indicate the determined operational state, in view of the current operational state, and otherwise choosing the joint transmission. Each singular transmission comprises, for example, transmitting one of the first and second indicators without transmitting the other one of the first and second indicators according to a defined temporal or logical linking of the first and second indicators. In a corresponding example, the joint transmission comprises transmitting the first and second indicators according to the defined temporal or logical linking of the first and second indicators.

Each singular transmission comprises, for example, transmitting one of the first and second indicators in a message that does not include the other one of the first and second indicators. An example joint transmission, conversely, comprises transmitting both indicators in the same message.

In one or more embodiments, each of the first and second indicators is a Medium Access Control (MAC) Control Element used by MAC-layer processing performed by the radio network node that communicates the indications to the device.

Figure 7:
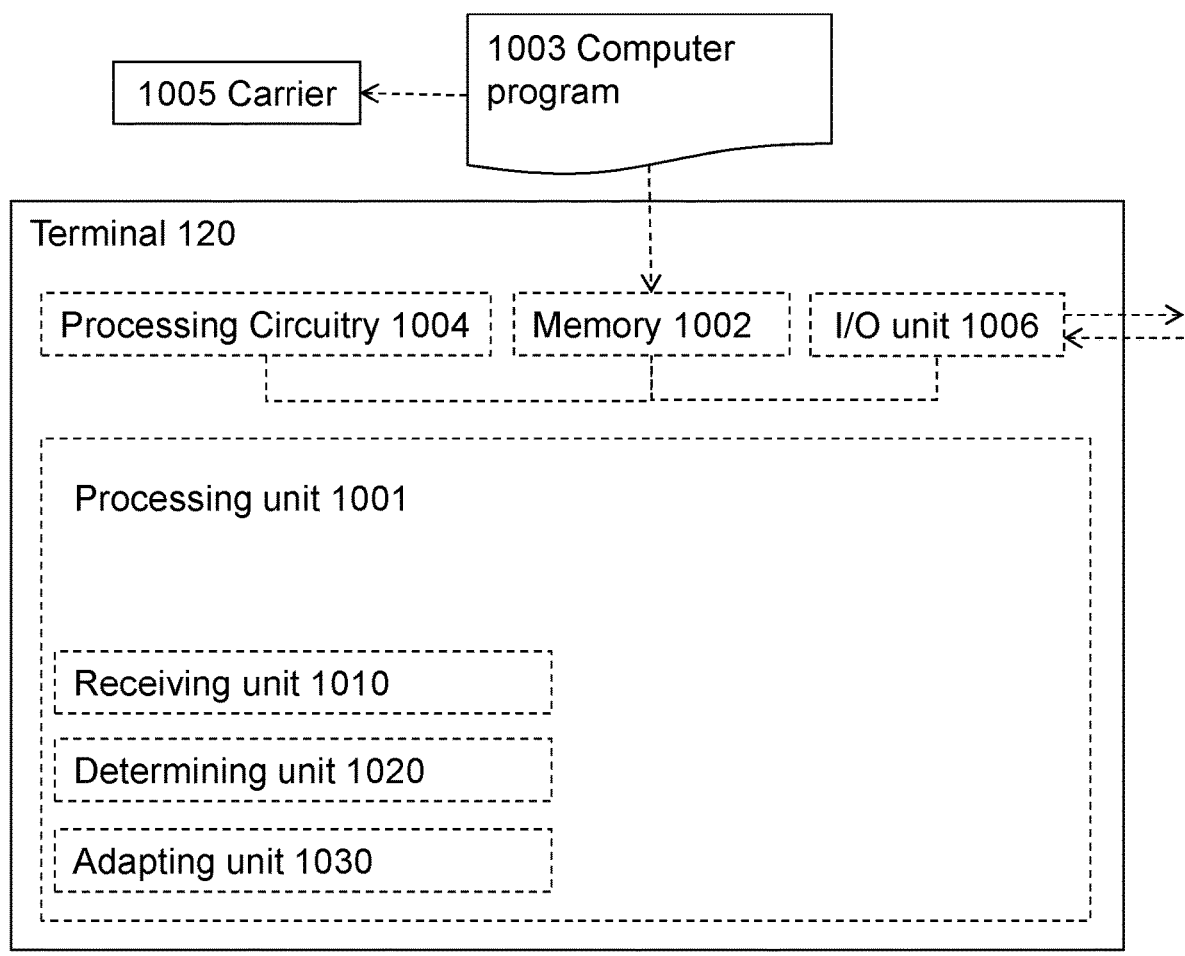

FIG. 7 is a schematic block diagram, illustrating an example arrangement of a wireless communication device, e.g., a UE 120. While FIG. 7 illustrates an arrangement that may be advantageous at least in certain applications, a UE based on a different arrangement may nonetheless be configured to carry out the method(s) of FIGS. 5 and/or 5a. Broadly, a wireless communication device may comprise fixed circuitry, programmatically-configured circuitry, or some mix thereof.

In FIG. 7, the example wireless communication device comprises a processing unit 1001, such as may be specially adapted to carry out the device-side operations disclosed herein. Such functionality may be embodied in computer program instructions of one or more computer programs stored in a computer-readable medium. Correspondingly, the device may include memory 1002, comprising one or more types of storage devices or circuitry. The memory may comprise, such as contain or store, instructions, e.g., in the form of a computer program 1003, which may comprise computer readable code units.

According to some embodiments herein, the processing unit 1001 comprises processing circuitry 1004 as an exemplifying hardware unit. In one or more examples, the processing circuitry 1004 comprises one or more processors that cause the device to carry out the device-side method(s) disclosed herein—e.g., the method(s) of FIGS. 5 and/or 5a—based on the execution of stored computer instructions, e.g., from the memory 1002.

In view of the above, in one example, there is provided a wireless communication device for performing a method of controlling the state of a cell in the network 100, for the device—i.e., controlling the cell state recognized or understood by the device for the cell. Such operations, in fact, apply to any number of cells included, e.g., the SCells included in a CA configuration of the device.

FIG. 7 further illustrates a carrier 1005, or program carrier, which stores the computer program 1003 described above.

In some embodiments, the processing unit 1001 may include or be associated with an Input/Output unit 1006. In an example embodiment, the Input/Output unit includes wireless communication circuitry, e.g., RF circuitry and associated supporting circuitry, configured for sending and receiving signals according to the requirements of the air interface used by the wireless communication network 100.

In a further example embodiment, the processing unit 1001 of the device comprises, or is at least functionally configured as, a receiving unit 1010, configured to perform step 312 of the method 310 in FIG. 5a. Still further, in at least one embodiment of the contemplated wireless communication device, the processing unit 1001 includes determining unit 1020, configured to perform step 314 of the method 310 in FIG. 5a. Additionally, the processing unit 1001 includes an adapting unit 1030, configured to perform step 316 of the method 310 in FIG. 5a.

In a particular embodiment, the communication circuitry comprising or included in the I/O unit 1006 is configured for wirelessly communicating with a radio network node 110 of the network 100. Communicating includes receiving a first indicator or a second indicator singularly, or receiving both indicators jointly, wherein the radio network node 110 uses the first and second indicators to indicate what the operational state of a serving cell 11 in the network 100 shall be for the device 120. The operational state can be any one of an activated state, a deactivated state, and a dormant state, and the "serving cell" may be one among one or more cells that are configured as SCells in a CA configuration of the device 120, where each SCell is subject to state control with respect to the device 120.

Further, the processing circuitry 1004 is operatively associated with the communication circuitry 1006 and configured to determine the indicated operational state as: for joint reception of the first and second indicators, interpret the first and second indicators jointly as a combination of values, according to which interpretation a first combination indicates the deactivated state, a second combination indicates the activated state, and a third combination indicates the dormant state; for singular reception of the first indicator, interpret a first value of the first indicator as indicating the deactivated state, interpret a second value of the first indicator as indicating no change in the operational state, if a current operational state is the dormant state or the activated state, and interpret the second value of the first indicator as indicating the activated state, if the current operational state is the deactivated state; and for singular reception of the second indicator, interpret a first value of the second indicator as indicating the activated state, if a current operational state is the dormant state, interpret the first value of the second indicator as indicating no change in the operational state, if the current operational state is not the dormant state, and interpret a second value of the second indicator as indicating the dormant state.

As previously noted, the first and second indicators may be respective binary variables, and the device 120 may receive a first indicator and/or a second indicator for each of two more cells that are subject to state control for the device 120. In at least one embodiment, the processing circuitry 1004 is configured to recognize the joint reception of the first and second indicators (for a given serving cell of the device) as receipt of the first and second indicators according to a defined temporal or logical linking, recognize the singular reception of the first indicator as receipt of the first indicator without receiving the second indicator according to the defined temporal or logical linking, and recognize the singular reception of the second indicator as receipt of the second indicator without receiving the first indicator according to the defined temporal or logical linking.

The defined logical linking comprises, in an example arrangement, inclusion of the first and second indicators in the same message, as transmitted by the radio network node 110 and received at the device 120. Additionally, in one or more embodiments, each of the first and second indicators is a Medium Access Control (MAC) Control Element used by MAC-layer processing implemented in the processing circuitry 1004. That is, the first and second indicators may be comprised in—conveyed in—respective MAC CEs. A first type of MAC CE, e.g., the aforementioned legacy MAC CE conveys a first indicator for each of the serving cells subject to state control, while a second type of MAC CE, e.g., the aforementioned dormancy MAC CE conveys a second indicator for each of the serving cells subject to state control.

In a corresponding example, a singular reception of the first indicator(s) at the device 120 comprises the device 120 receiving the legacy MAC CE in a transmission from the radio network node 110 without receiving the dormancy MAC CE. Here, "without receiving the dormancy MAC CE" means that the dormancy MAC CE was not received in temporally or logically linked fashion with the legacy MAC CE. A singular reception of the second indicator(s) at the device 120 comprises the device 120 receiving the dormancy MAC CE in a transmission from the radio network node 110 without receiving the legacy MAC CE. A joint reception of the first and second indicators at the device 120 comprises the device 120 receiving the legacy and dormancy MAC CEs in the same transmission or otherwise receiving them according to a defined temporal or logical linking.

Figure 8:
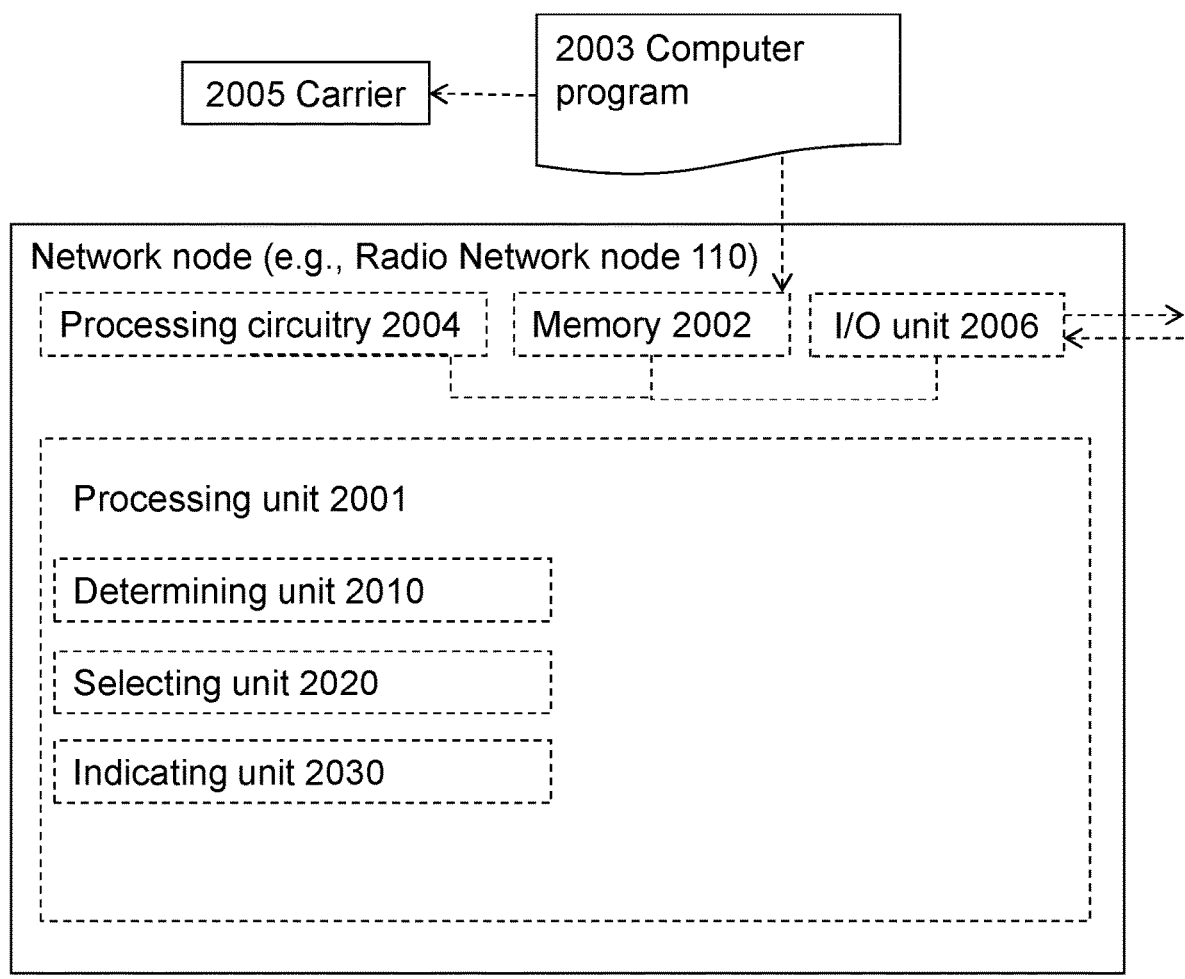

FIG. 8 is a schematic block diagram, illustrating an example arrangement of a network node configured for operation in a wireless communication network, such as a core network node or a radio network node, e.g., the radio network node 110. While FIG. 8 illustrates an arrangement that may be advantageous at least in certain applications, a network node based on a different arrangement may nonetheless be configured to carry out the method(s) of FIGS. 6 and/or 6a. Broadly, a network node may comprise fixed circuitry, programmatically-configured circuitry, or some mix thereof.

In FIG. 8, the example network node comprises a processing unit 2001, such as may be specially adapted to carry out the network-side operations disclosed herein. Such functionality may be embodied in computer program instructions of one or more computer programs stored in a computer-readable medium. Correspondingly, the network node may include memory 2002, comprising one or more types of storage devices or circuitry. The memory may comprise, such as contain or store, instructions, e.g., in the form of a computer program 1\2003, which may comprise computer readable code units stored or conveyed via a carrier 2005.

In a further example embodiment, the processing unit 2001 of the network node comprises, or is at least functionally configured as, a determining unit 2010, configured to perform step 412 of the method 410 in FIG. 6a. Still further, in at least one embodiment of the contemplated network node, the processing unit 2001 includes selecting unit 2020, configured to perform step 414 of the method 410 in FIG. 6a. Additionally, the processing unit 2001 includes an indicating unit 2030, configured to perform step 416 of the method 410 in FIG. 6a.

Thus, in one or more embodiments, the processing unit 2001 is configured to carry out any one or more of the network-side methods disclosed herein. As noted, the processing unit 2001 comprises fixed circuitry, programmatically-configured circuitry, or a mix of both. In at least one embodiment, the processing unit 2001 comprises processing circuitry that is specially adapted for the network-side operations disclosed herein, based on its execution of computer instructions stored in a computer-readable medium. For example, in one or more embodiments, the network node 110 further comprises a memory 2002 that stores the computer instructions, e.g., in the form of a computer program 2003, which may comprise computer readable code units.

In view of the above, in one example, there is provided a network node 110 for performing a method for controlling the state of a cell for a device 120. The network node 110 may be configured to perform, for example, the method operations disclosed in FIGS. 6 and/or 6a.

In some embodiments, the processing unit 2001 comprises or is otherwise associated with an Input/Output unit 2006, which comprises, for example, one or more types of communication circuitry, such as RF communication circuitry for transmitting and receiving via the air interface implemented by the radio network node 110. Thus, the Input/Output Unit 2006 also may be referred to as "communication circuitry 2006".

In a corresponding example implementation, a radio network node 110 is configured for operation in a wireless communication network 100, and it includes communication circuitry 2006 configured for wirelessly communicating with a wireless communication device 120. The radio network node 110 further includes processing circuitry 2004 that is operatively associated with the communication circuitry 2006 and configured to perform step 412 of FIG. 6a. The processing circuitry 2004 is further configured to perform steps 414 and 414a of FIG. 6a.

The processing circuitry 2004 in an example implementation is configured to choose one of the singular transmissions, if one of the singular transmissions can be used to indicate the determined operational state, in view of the current operational state, and otherwise, choose the joint transmission. That is, the processing circuitry 2004 prefers the use/transmission of a single indicator per cell for state control in view of the lower signaling overhead as compared to the use/transmission of two indicators per cell for state control. However, if any one of the cells subject to state control for the device cannot be moved to or maintained in the desired state according to the sequential (state-dependent) control logic applicable to singular use of either the first or second indicators, the processing circuitry 2004 jointly transmits first and second indicators, as the joint pairings of first and second indicators form combinational values that provide for absolute control over the cell state, irrespective of the current state.

The processing circuitry 2004 is configured to carry out each singular transmission by transmitting one of the first and second indicators without transmitting the other one of the first and second indicators according to a defined temporal or logical linking of the first and second indicators, and to carry out the joint transmission by transmitting the first and second indicators according to the defined temporal or logical linking of the first and second indicators.

The processing circuitry 2004 is configured to carry out each singular transmission by, for example, transmitting one of the first and second indicators in a message that does not include the other one of the first and second indicators, and to carry out the joint transmission by transmitting both indicators in the same message. Each of the first and second indicators is a Medium Access Control (MAC) Control Element used by MAC-layer processing performed by the radio network node 110.

In at least one implementation, the processing circuitry 2004 is configured to determine what the operational state of a serving cell 11 in the network 100 shall be for a wireless communication device 120, wherein the operational state can be any one of an activated state, a deactivated state, and a dormant state. Further, the processing circuitry 2004 is configured to select a signaling mechanism to use for indicating the determined operational state to the wireless communication device 120, by choosing from among a singular transmission of a first indicator, a singular transmission of a second indicator, or a joint transmission of both indicators. Still further, the processing circuitry 2004 is configured to indicate the determined operational state to the wireless communication device 120, using the selected signaling mechanism. For example, the processing circuitry 2004 uses the I/O unit 2006 to send signaling conveying the indication. Correspondingly, the I/O unit 2006 comprises inter-node communication circuitry, such as computer data network circuitry for communicating with a node that has a radio link to the device 120 and/or comprises RF circuitry for communication directly with the device 120 via the air interface.

Figure 9:
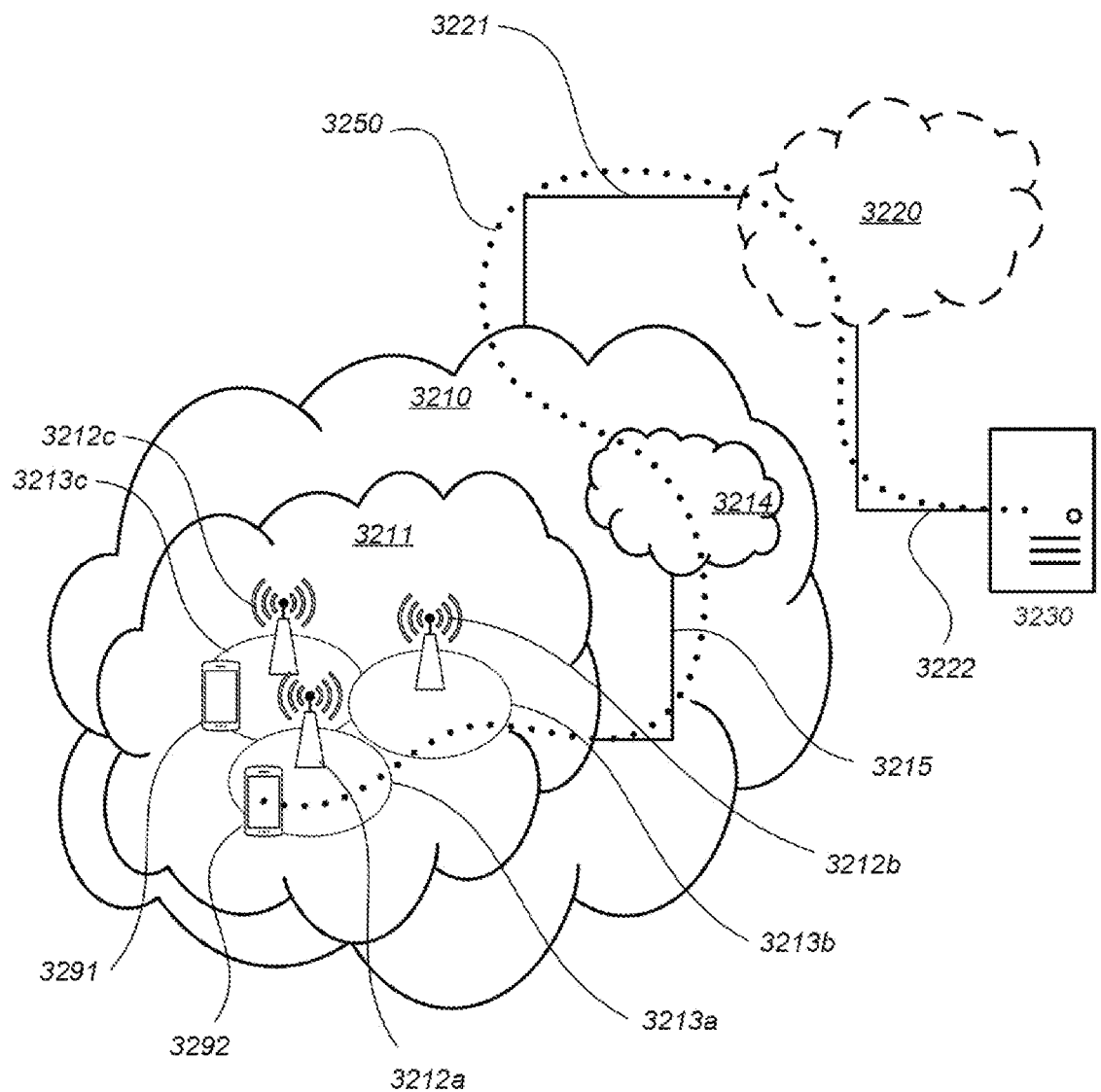
FIG. 9 is a block diagram of another embodiment of a wireless communication network and a host computer configured to exchange data with a wireless communication device via the wireless communication network.

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as APs, NB s, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE), such as a STA 3291 located in coverage area 3213c, is configured to wirelessly connect to, or be paged by, the corresponding base station 3212c. A second UE, such as a STA 3292 in coverage area 3213a is wirelessly connectable to the corresponding base station 3212a. While a plurality of UEs are illustrated in this example, the disclosed embodiments are equally applicable to a situation where a sole UE is in the coverage area or where a sole UE is connecting to a respective base station. The base stations 3212a, 3212b, 3212c may be equivalent to network nodes 110 as described previously. The UEs 3291 and 3292 may be equivalent to devices/terminals 120 as described previously.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected STAs 3291, 3292—also referred to as UEs 3291 and 3292—and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct, or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. The UE hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
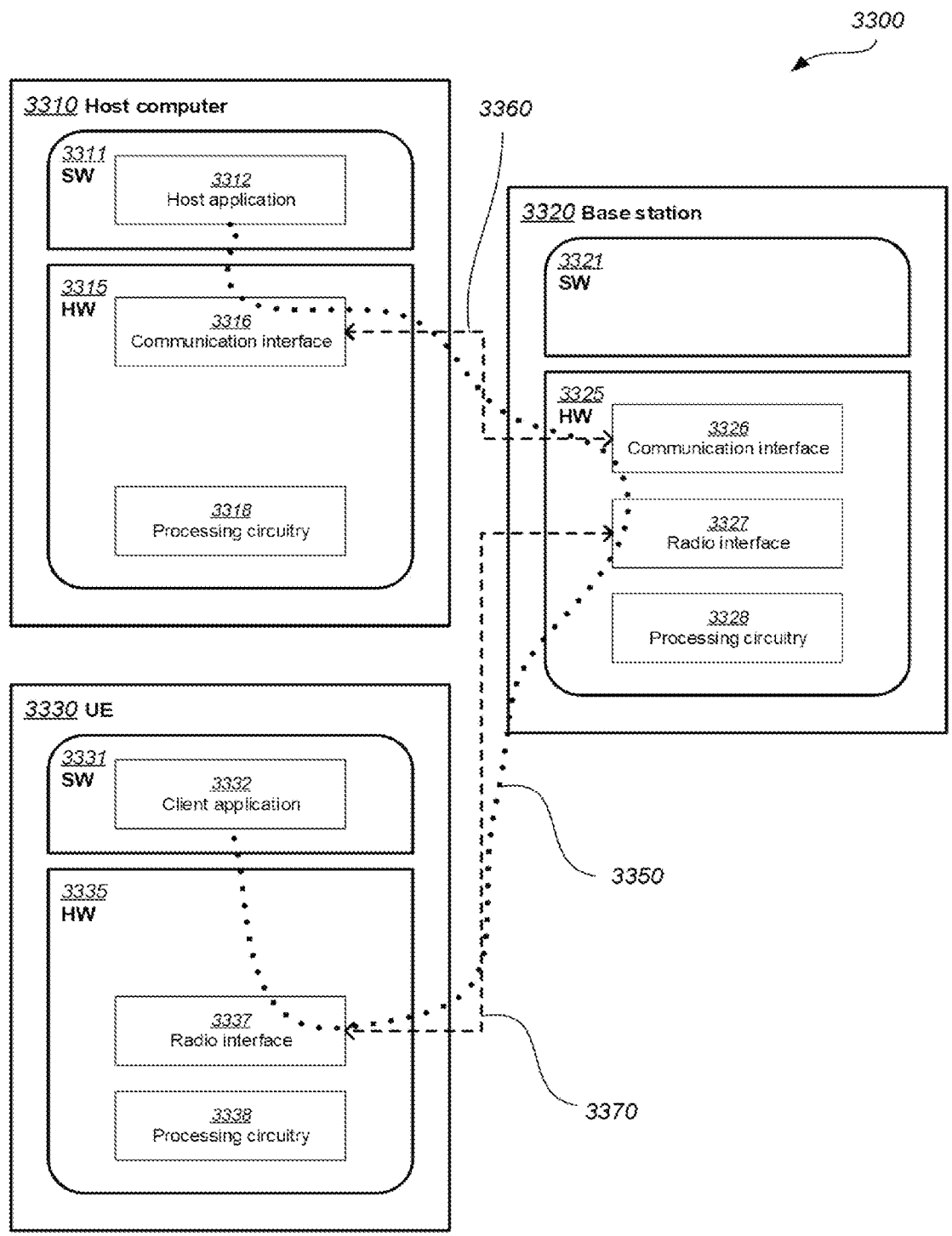
FIG. 10 is a block diagram illustrating example embodiments of a wireless communication device, a radio network node, and a host computer, such as introduced in FIG. 9.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10, and independently, the surrounding network topology may be that of FIG. 9.

In FIG. 10, the OTT connection 3350 has been drawn abstractly to illustrate the communication between the host computer 3310 and the UE 3330 via the base station 3320, without explicit reference to any intermediary devices and the precise routing of messages via these devices. The network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. For example, the base station 3320 determines a CA configuration for the UE 3330 that includes one or more SCells subject to state control and the base station 3320 performs such control according to the details of FIGS. 6 and/or 6a, for example. Correspondingly, the UE 3330 determines what the state(s) shall be for one or more serving cells—e.g., the SCells in its CA configuration—based on receiving indicators from the base station 3320, such as in keeping with the example operations shown in FIGS. 5 and/or 5a. Such network-side and device-side operations facilitate ongoing state control of aggregated carriers used to provide connectivity supporting the exchange of data between the UE 3330 and the host computer 3310, including the advantageous activation/deactivation and/or dormancy control of respective ones of those cells, in view of, for example, the data rates needed to support such communications.

Thus, one or more of the various embodiments disclosed herein improve the performance of OTT services provided to the UE 3330 using the OTT connection 3350, in which the wireless connection 3370 forms the last segment. More precisely, the teachings of these embodiments may improve the data rate, latency, and power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing, etc. The reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular, empty or "dummy" messages, using the OTT connection 3350 while it monitors propagation times, errors, etc.

Figures 11, 12:
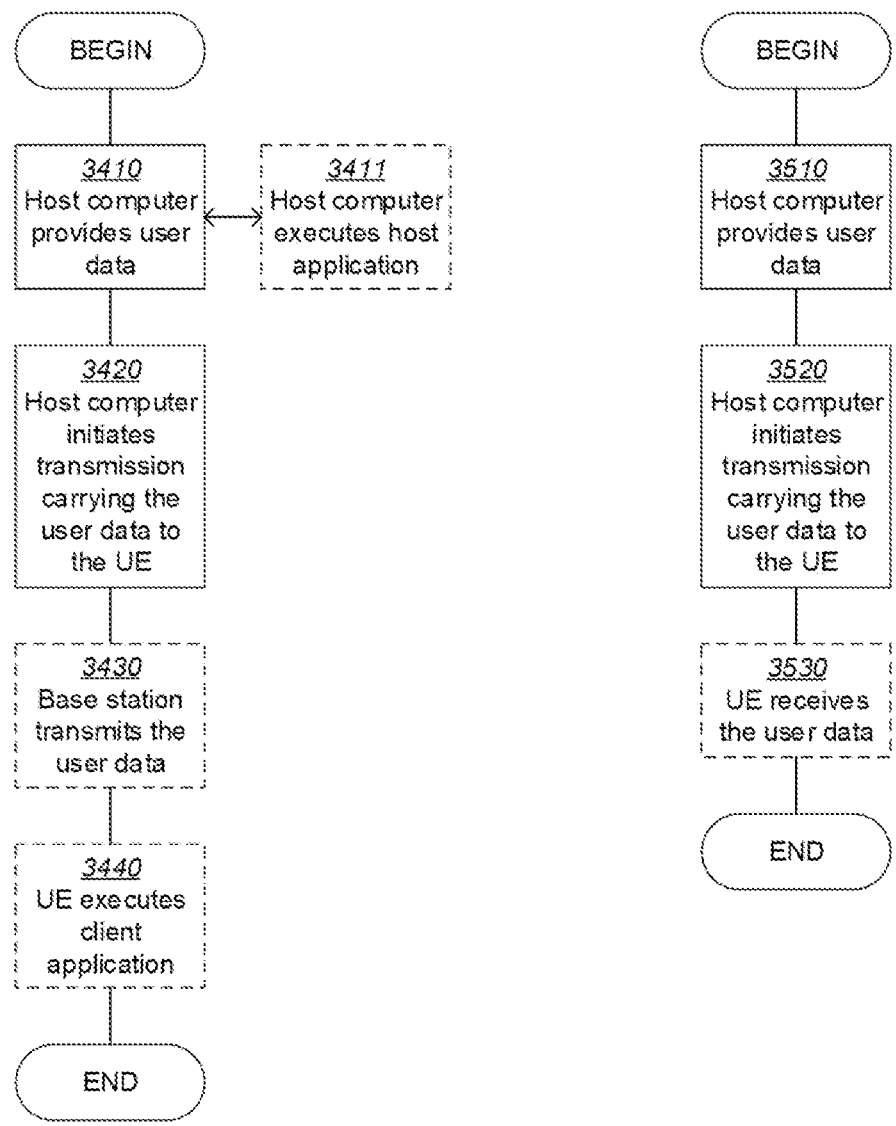
FIGS. 11-14 are a logic flow diagrams illustrating various embodiments of respective methods of operation for a wireless communication device, a radio network node, and a host computer, such as illustrated in FIG. 9.

FIG. 11 is a flowchart illustrating a method implemented in a communication system, in accordance with one embodiment. The communication system includes a host computer, a base station such as an AP, and a UE such as a STA which may be those described with reference to FIGS. 9 and 10. For simplicity of the present disclosure, only drawing references to FIG. 11 will be included in this section. In a first step 3410 of the method, the host computer provides user data. In an optional sub-step 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station such as an AP, and a UE such as a STA which may be those described with reference to FIGS. 9 and 10. For simplicity of the present disclosure, only drawing references to FIG. 12 will be included in this section. In a first step 3510 of the method, the host computer provides user data. In an optional sub-step (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 13, 14:
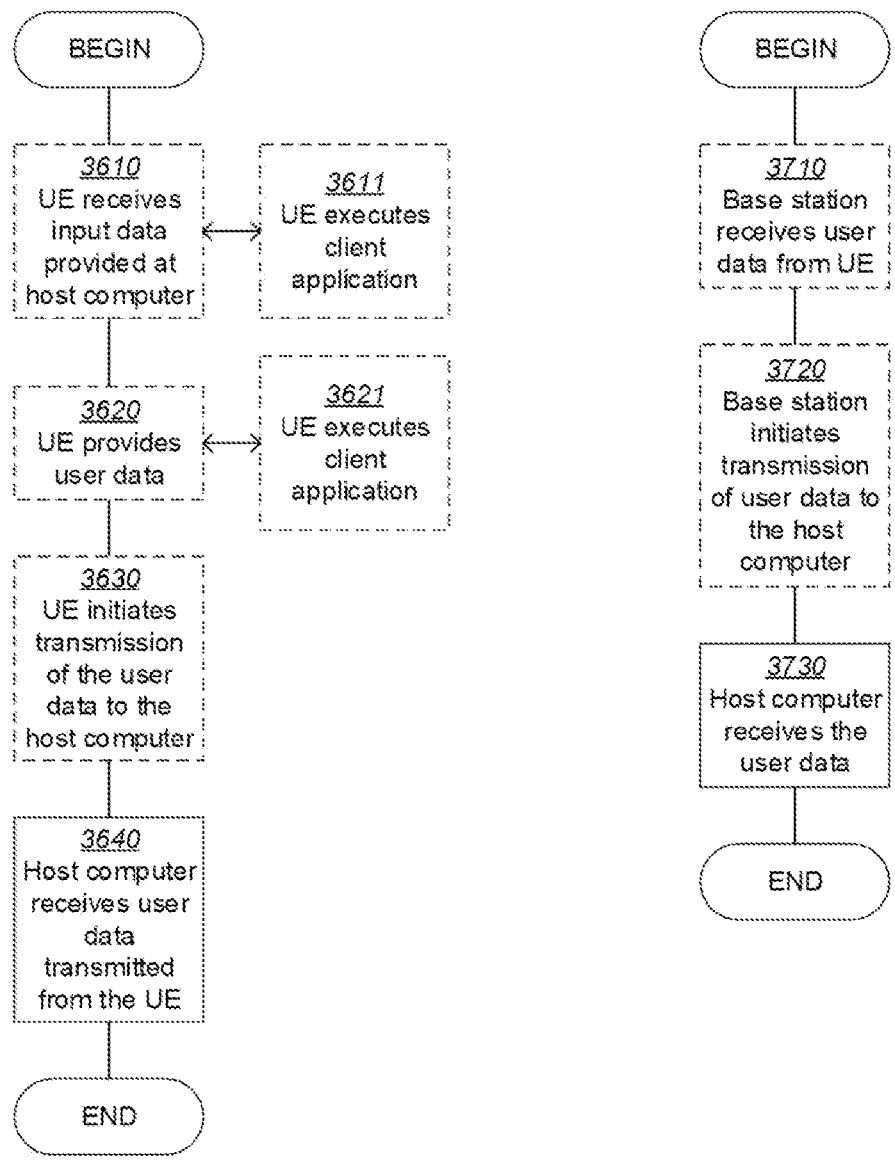

FIG. 13 is a flowchart illustrating a method implemented in a communication system, in accordance with one embodiment. The communication system includes a host computer, a base station such as an AP, and a UE such as a STA which may be those described with reference to FIGS. 9 and 10. For simplicity of the present disclosure, only drawing references to FIG. 13 will be included in this section. In an optional first step 3610 of the method, the UE receives input data provided by the host computer. Additionally, or, alternatively, in an optional second step 3620, the UE provides user data. In an optional sub-step 3621 of the second step 3620, the UE provides the user data by executing a client application. In a further optional sub-step 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third sub-step 3630, transmission of the user data to the host computer. In a fourth step 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station such as an AP, and a UE such as a STA which may be those described with reference to FIGS. 9 and 10. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a wireless communication device operating in a wireless communication network, the method comprising:
  receiving a first indicator or a second indicator singularly, or receiving both indicators jointly, wherein a radio network node in the wireless communication network uses the first and second indicators to indicate what the operational state of a serving cell in the network shall be for the wireless communication device, where the operational state can be any one of an activated state, a deactivated state, and a dormant state; and
  determining the indicated operational state in dependence on:
    received values of the first and second indicators, responsive to joint reception of the first and second indicators; and
    a received value of the first or second indicator and a current operational state, responsive to singular reception of the first or second indicator.

2. The method of claim 1, wherein, for joint reception of the first and second indicators, determining the indicated operational state comprises interpreting the received values of the first and second indicators jointly as a combination of values, according to which interpretation a first combination indicates the deactivated state, a second combination indicates the activated state, and a third combination indicates the dormant state.

3. The method of claim 1, wherein, for singular reception of the first indicator, the received value comprises one of a first value or a second value, and determining the indicated operational state comprises:
  interpreting the first value of the first indicator as indicating the deactivated state;
  interpreting the second value of the first indicator as indicating no change in the operational state, if the current operational state is the dormant state or the activated state; and
  interpreting the second value of the first indicator as indicating the activated state, if the current operational state is the deactivated state.

4. The method of claim 1, wherein, for singular reception of the second indicator, the received value comprises one of a first value or a second value, and determining the indicated operational state comprises:
  interpreting the first value of the second indicator as indicating the activated state, if the current operational state is the dormant state;
  interpreting the first value of the second indicator as indicating no change in the operational state, if the current operational state is not the dormant state; and
  interpreting the second value of the second indicator as indicating the dormant state.

5. The method of claim 1, wherein the first and second indicators are respective binary variables.

6. The method of claim 1, wherein the wireless communication device recognizes the joint reception of the first and second indicators as receipt of the first and second indicators according to a defined temporal or logical linking, recognizes the singular reception of the first indicator as receipt of the first indicator without receiving the second indicator according to the defined temporal or logical linking, and recognizes the singular reception of the second indicator as receipt of the second indicator without receiving the first indicator according to the defined temporal or logical linking.

7. The method of claim 6, wherein the defined logical linking comprises inclusion of the first and second indicators in the same message, as transmitted by the radio network node and received at the wireless communication device.

8. The method of claim 1, further comprising adapting operation of the wireless communication device with respect to the serving cell, according to the indicated operational state of the serving cell.

9. The method of claim 1, wherein each of the first and second indicators is a Medium Access Control (MAC) Control Element used by MAC-layer processing performed by the wireless communication device.

10. A wireless communication device configured for operation in a wireless communication network, the wireless communication device comprising:
communication circuitry for wirelessly communicating with a radio network node of the wireless communication network, including receiving a first indicator or a second indicator singularly, or receiving both indicators jointly, wherein the radio network node uses the first and second indicators to indicate what the operational state of a serving cell in the network shall be for the wireless communication device, where the operational state can be any one of an activated state, a deactivated state, and a dormant state; and
processing circuitry operatively associated with the communication circuitry and configured to determine the indicated operational state in dependence on:
received values of the first and second indicators, responsive to joint reception of the first and second indicators; and
a received value of the first or second indicator and a current operational state, responsive to singular reception of the first or second indicator.

11. The wireless communication device of claim 10, wherein, for joint reception of the first and second indicators, the processing circuitry is configured to determine the indicated operational state by interpreting the received values of the first and second indicators jointly as a combination of values, according to which interpretation a first combination indicates the deactivated state, a second combination indicates the activated state, and a third combination indicates the dormant state.

12. The wireless communication device of claim 10, wherein, for singular reception of the first indicator, the received value comprises one of a first value or a second value, and the processing circuitry is configured to:
interpret the first value of the first indicator as indicating the deactivated state;
interpret the second value of the first indicator as indicating no change in the operational state, if a current operational state is the dormant state or the activated state; and
interpret the second value of the first indicator as indicating the activated state, if the current operational state is the deactivated state.

13. The wireless communication device of claim 10, wherein, for singular reception of the second indicator, the received value comprises one of a first value or a second value, and the processing circuitry is configured to:
interpret the first value of the second indicator as indicating the activated state, if a current operational state is the dormant state;
interpret the first value of the second indicator as indicating no change in the operational state, if the current operational state is not the dormant state; and
interpret the second value of the second indicator as indicating the dormant state.

14. The wireless communication device of claim 10, wherein the first and second indicators are respective binary variables.

15. The wireless communication device of claim 10, wherein the processing circuitry is configured to recognize the joint reception of the first and second indicators as receipt of the first and second indicators according to a defined temporal or logical linking, recognize the singular reception of the first indicator as receipt of the first indicator without receiving the second indicator according to the defined temporal or logical linking, and recognize the singular reception of the second indicator as receipt of the second indicator without receiving the first indicator according to the defined temporal or logical linking.

16. The wireless communication device of claim 15, wherein the defined logical linking comprises inclusion of the first and second indicators in the same message, as transmitted by the radio network node and received at the wireless communication device.

17. The wireless communication device of claim 10, wherein the processing circuitry is configured to adapt operation of the wireless communication device with respect to the serving cell, according to the indicated operational state of the serving cell.

18. The wireless communication device of claim 10, wherein each of the first and second indicators is a Medium Access Control (MAC) Control Element used by MAC-layer processing implemented in the processing circuitry.

19. A method of operation at a radio network node configured for operation in a wireless communication network, the method comprising:
determining what the operational state of a serving cell in the network shall be for a wireless communication device, wherein the operational state can be any one of an activated state, a deactivated state, and a dormant state;
selecting a signaling mechanism to use for indicating the determined operational state to the wireless communication device, by choosing from among a singular transmission of a first indicator, a singular transmission of a second indicator, or a joint transmission of both indicators; and
indicating the determined operational state to the wireless communication device, using the selected signaling mechanism;
wherein, for the joint transmission of both indicators, a combination of values of the first and second indicators indicates the determined operational state; and
wherein, for singular transmission of the first indicator or the second indicator, a value of the first indicator or the second indicator and a current operational state of the serving cell indicates the determined operational state.

20. The method of claim 19,
wherein, for the joint transmission of both indicators, a first combination of values of the first and second indicators indicates the deactivated state, a second combination indicates the activated state, and a third combination indicates the dormant state, and
wherein, for the singular transmission of the first indicator, a first value indicates the deactivated state, a second value indicates no change in the operational state, if the current operational state is the dormant state or the activated state, and the second value indicates the activated state, if the current operational state is the deactivated state, and wherein, for the singular transmission of the second indicator, a first value indicates the activated state, if the current operational state is the dormant state, the first value indicates no change in the operational state, if the current operational state is not the dormant state, and a second value indicates the dormant state.

\* \* \* \* \*